United States Patent
Noguchi et al.

(10) Patent No.: US 9,588,627 B2
(45) Date of Patent: Mar. 7, 2017

(54) DISPLAY DEVICE WITH TOUCH DETECTION FUNCTION AND ELECTRONIC APPARATUS

(71) Applicant: Japan Display Inc., Tokyo (JP)

(72) Inventors: Koji Noguchi, Tokyo (JP); Takafumi Suzuki, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 14/854,580

(22) Filed: Sep. 15, 2015

(65) Prior Publication Data

US 2016/0004369 A1  Jan. 7, 2016

Related U.S. Application Data

(63) Continuation of application No. 14/185,553, filed on Feb. 20, 2014, now Pat. No. 9,329,741.

(30) Foreign Application Priority Data

Mar. 8, 2013  (JP) ................................. 2013-047166

(51) Int. Cl.
*G06F 3/044* (2006.01)
*G02F 1/1333* (2006.01)
(Continued)

(52) U.S. Cl.
CPC .......... *G06F 3/044* (2013.01); *G02F 1/13338* (2013.01); *G06F 3/047* (2013.01);
(Continued)

(58) Field of Classification Search
CPC ....................... G06F 3/044; G06F 2203/04107
See application file for complete search history.

(56) References Cited

U.S. PATENT DOCUMENTS 9,019,231 B2  4/2015  Minami et al.
2010/0013778 A1*  1/2010  Liu ....................... G06F 1/1626
345/173

(Continued)

FOREIGN PATENT DOCUMENTS

CN  102419670  4/2012
CN  102929426  2/2013
(Continued)

OTHER PUBLICATIONS

Taiwan Office Action issued Jun. 10, 2015 in corresponding Taiwan Application No. 103106137.
(Continued)

*Primary Examiner* — Liliana Cerullo
(74) *Attorney, Agent, or Firm* — K&L Gates LLP

(57) ABSTRACT

According to an aspect, a display device with a touch detection function includes: a first substrate; a plurality of pixel electrodes in a first region; a display functional layer; a plurality of first drive electrodes facing the pixel electrodes in a perpendicular direction with respect to a surface of the first substrate; and a plurality of touch detection electrodes facing the first drive electrodes and extending in a direction different from a direction in which the first drive electrodes are extended. At least one touch detection electrode of the plurality of touch detection electrodes extends from the first region to a second region adjacent to the first region. A second drive electrode capacitively-coupled to the at least one touch detection electrode is further provided in the second region.

21 Claims, 26 Drawing Sheets

(51) Int. Cl.
*G06F 3/041* (2006.01)
*G06F 3/047* (2006.01)
*G09G 3/34* (2006.01)
*G09G 3/36* (2006.01)

(52) U.S. Cl.
CPC .......... *G06F 3/0412* (2013.01); *G06F 3/0416* (2013.01); *G09G 3/3406* (2013.01); *G09G 3/36* (2013.01); *G09G 2300/0426* (2013.01)

(56) References Cited

U.S. PATENT DOCUMENTS

| | | | |
|---|---|---|---|
| 2010/0182273 A1 | 7/2010 | Noguchi et al. | |
| 2012/0032917 A1* | 2/2012 | Yamaguchi | G06F 3/0416 345/174 |
| 2012/0105345 A1 | 5/2012 | Lazaridis | |
| 2012/0162584 A1 | 6/2012 | Chang | |
| 2012/0182258 A1* | 7/2012 | Kubo | G06F 3/03547 345/174 |
| 2012/0249446 A1* | 10/2012 | Chen | G06F 3/044 345/173 |

FOREIGN PATENT DOCUMENTS

| | | |
|---|---|---|
| JP | 2007-047851 | 2/2007 |
| JP | 2007-179520 | 7/2007 |
| JP | 2009-244958 | 10/2009 |
| JP | 2012-073783 | 4/2012 |
| JP | 2012-150594 | 8/2012 |
| TW | 201001010 | 1/2010 |
| WO | 2010/126072 | 11/2010 |

OTHER PUBLICATIONS

Japanese Office Action issued Mar. 8, 2016, in corresponding Japanese Application No. 2013-047166.
Korean Office Action issued Aug. 20, 2015 in corresponding Korean Application No. 10-2014-0026183.
Chinese Office Action issued Jun. 13, 2016 in corresponding Chinese Application No. 2014100841350.

* cited by examiner

DISPLAY DEVICE WITH TOUCH DETECTION FUNCTION AND ELECTRONIC APPARATUS

CROSS REFERENCES TO RELATED APPLICATIONS

The present application is a continuation application of U.S. application Ser. No. 14/185,553, filed Feb. 20, 2014, which application claims priority to Japanese Priority Patent Application JP 2013-047166 filed in the Japan Patent Office on Mar. 8, 2013, the entire content of which is hereby incorporated by reference.

BACKGROUND

1. Technical Field

The present disclosure relates to a display device and an electronic apparatus capable of detecting an external proximity object, and in particular, to a display device with a touch detection function and an electronic apparatus capable of detecting an external proximity object based on a change in an electrostatic capacitance.

2. Description of the Related Art

In recent years, a touch detection device capable of detecting an external proximity object, what is called a touch panel, has been attracting attention. The touch panel is mounted on or integrated into a display device such as a liquid crystal display unit, and thus used in a display device with a touch detection function in which the touch panel. The display device with a touch detection function displays various button images, or the like, on the display device to allow for information input with the use of the touch panel in place of typical mechanical buttons. The display device with a touch detection function having such a touch panel does not require input devices such as a keyboard, a mouse, and a keypad. Therefore, in addition to computers, the use thereof has been expanding also in mobile devices such as smartphones.

In a smartphone, a tablet, or the like, in addition to providing a touch panel for 2D (two-dimensional) touch input on a display area, buttons for performing 0D (zero-dimensional, ON and OFF) input may be provided outside the display area. For example, in a smartphone or the like, a "back button" for displaying a previous screen, a "home button" for displaying a home screen, a "menu button" for displaying a menu screen, and the like, may be provided. Such a button is sometimes referred to as a 0D button. The 0D button is implemented by disposing a button member on FPC (Flexible Printed Circuits) or the like, separately from the touch panel.

As related techniques, the following Japanese Patent Application Laid-open Publication No. 2007-179520 (JP-A-2007-179520) and Japanese Patent Application Laid-open Publication No. 2009-244958 (JP-A-2009-244958) each describe a technique for enabling input by disposing a detection element in a frame outside a display area of a liquid crystal display unit.

With the techniques described in JP-A-2007-179520 and JP-A-2009-244958, however, a detection circuit for the detection element in the frame is needed separately from a touch panel. Thus, there are problems in that the device is complicated, the number of components is increased, and the cost is increased.

For the foregoing reasons, there is a need for a display device with a touch detection function and an electronic apparatus capable of detecting button touch input with a simple configuration.

SUMMARY

According to an aspect, a display device with a touch detection function includes: a first substrate; a plurality of pixel electrodes arranged in a matrix on a plane parallel to the first substrate and in a first region; a display functional layer exerting an image display function in the first region; a plurality of first drive electrodes facing the pixel electrodes in a perpendicular direction with respect to a surface of the first substrate; and a plurality of touch detection electrodes facing the first drive electrodes in the perpendicular direction and extending in a direction different from a direction in which the first drive electrodes are extended, the plurality of touch detection electrodes being capacitively-coupled to the first drive electrodes. At least one touch detection electrode of the plurality of touch detection electrodes extends from the first region to a second region adjacent to the first region. A second drive electrode capacitively-coupled to the at least one touch detection electrode is further provided in the second region.

According to another aspects, a display device with a touch detection function includes: a first substrate; a plurality of pixel electrodes arranged in a matrix on a plane parallel to the first substrate and in a first region; a display functional layer exerting an image display function; a plurality of first drive electrodes facing the pixel electrodes in a perpendicular direction with respect to a surface of the first substrate; a plurality of first touch detection electrodes facing the first drive electrodes in the perpendicular direction and extending in a direction different from a direction in which the first drive electrodes are extended, the plurality of first touch detection electrodes being capacitively-coupled to the first drive electrodes; a second drive electrode formed in a second region adjacent to the first region; a second touch detection electrode capacitively-coupled to the second drive electrode in the second region; and a drive signal supplying circuit for supplying a drive signal to the first and second drive electrodes. The drive signal supplying circuit sequentially selects the plurality of first drive electrodes and the second drive electrode to supply the drive signal thereto.

According to another aspect, a display device with a touch detection function includes: a first substrate; a plurality of pixel electrodes arranged in a matrix on a plane parallel to the first substrate and in a first region; a display functional layer exerting an image display function; a plurality of first drive electrodes facing the pixel electrodes in a perpendicular direction with respect to a surface of the first substrate; a plurality of touch detection electrodes facing the first drive electrodes in the perpendicular direction and extending in a direction different from a direction in which the first drive electrodes are extended, the plurality of touch detection electrodes being capacitively-coupled to the first drive electrodes; a second drive electrode capacitively-coupled to at least one touch detection electrode of the plurality of touch detection electrodes in a second region adjacent to the first region; and a second substrate facing the first substrate in the perpendicular direction. The second substrate includes a portion not overlapping the first substrate as viewed from the perpendicular direction. The second drive electrode is formed in the portion of the second substrate not overlapping the first substrate.

According to another aspect, a display device with a touch detection function includes: a first substrate; a plurality of pixel electrodes arranged in a matrix on a plane parallel to the first substrate and in a first region; a display functional layer exerting an image display function; a plurality of first drive electrodes facing the pixel electrodes in a perpendicular direction with respect to a surface of the first substrate; a plurality of first touch detection electrodes facing the first drive electrodes in the perpendicular direction and extending in a direction different from a direction in which the first drive electrodes are extended, the plurality of first touch detection electrodes being capacitively-coupled to the first drive electrodes; a second drive electrode formed in a second region adjacent to the first region; a second touch detection electrode capacitively-coupled to the second drive electrode in the second region; a drive signal supplying circuit for supplying a drive signal to the first and second drive electrodes; and a third substrate for transmitting a detection signal detected in the second touch detection electrode to an outside. The second touch detection electrode is formed on the third substrate.

According to another aspect, an electronic apparatus includes any one of the display devices with a touch detection function.

Additional features and advantages are described herein, and will be apparent from the following Detailed Description and the figures.

DETAILED DESCRIPTION

Modes for carrying out the present disclosure (embodiments) will be described in detail with reference to the drawings. The present disclosure is not limited by the contents described in the following embodiments. Constituent elements described below include those readily conceived of by those skilled in the art and substantially identical components. Furthermore, the Constituent elements described below can be appropriately combined with one another. A description will be given in the following order:

1. Embodiments (Display device with touch detection function)
   1-1. First embodiment
   1-2. Second embodiment
   1-3. Third embodiment
   1-4. Fourth embodiment
   1-5. Fifth embodiment
   1-6. Sixth embodiment
   1-7. Seventh embodiment
   1-8. Eighth embodiment
   1-9. Ninth embodiment
2. Application examples (Electronic apparatuses)

Examples in which the display device with a touch detection function according to any one of the embodiments above is applied to the electronic apparatuses.

Figure 1:
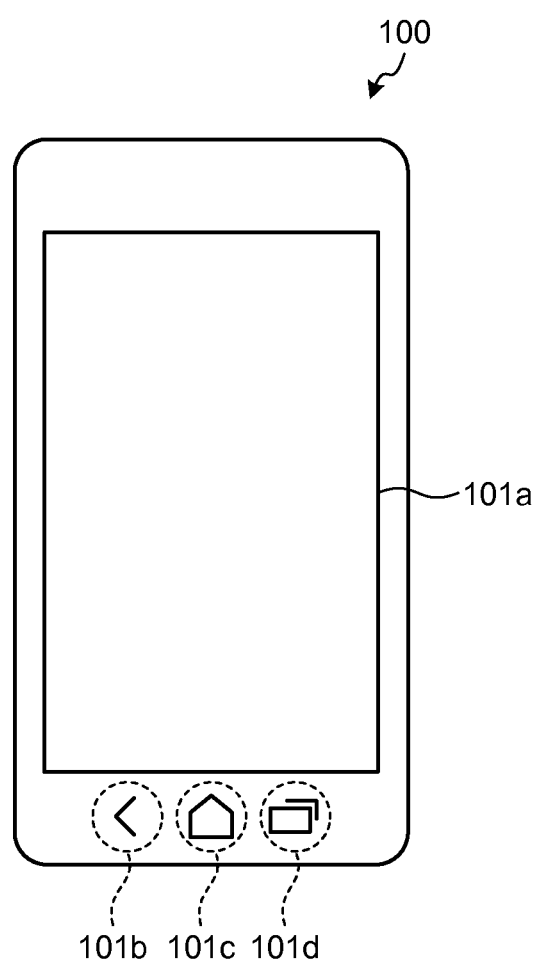
FIG. 1 is a diagram illustrating an appearance of a smartphone to which a display device with a touch detection function according to a first embodiment is applied.

3. Aspects of present disclosure
   1. Embodiments
   1-1. First Embodiment
   1-1A. Configuration Example FIG. 1 is a diagram illustrating an appearance of a smartphone to which a display device with a touch detection function according to the present embodiment is applied. Although an example in which the display device with a touch detection function according to the present embodiment is applied to a smartphone is illustrated here, the display device with a touch detection function according to the present embodiment can be applied to various types of electronic apparatuses such as a television and a digital camera as will be described later.

As illustrated in FIG. 1, a smartphone 100 includes a touch and display area 101a. The touch and display area 101a is implemented by using the later-described display device with a touch detection function according to the present embodiment. The touch and display area 101a can display images, characters, and the like, and perform 2D (two-dimensional) touch detection. The smartphone 100 also includes 0D buttons 101b to 101d (hereinafter, also referred to simply as buttons) capable of performing 0D (zero-dimensional, ON and OFF) touch detection outside the touch and display area 101a, e.g., in a frame. The button 101b is a "back button" for displaying a previous screen. The button 101c is a "home button" for displaying a home screen. The button 101d is a "menu button" for displaying a menu screen. The buttons 101b to 101d are also implemented by using the later-described display device with a touch detection function according to the present embodiment.

The 2D touch detection herein means that a coordinate of a touch position is determined. The 0D touch detection herein means that only the presence or absence of a touch is determined.

Although a case where the display device with a touch detection function has three buttons 101b to 101d is described in the present embodiment, the number of buttons may be 1 or 2, or may be four or more.

Overall Configuration Example

Figure 2:
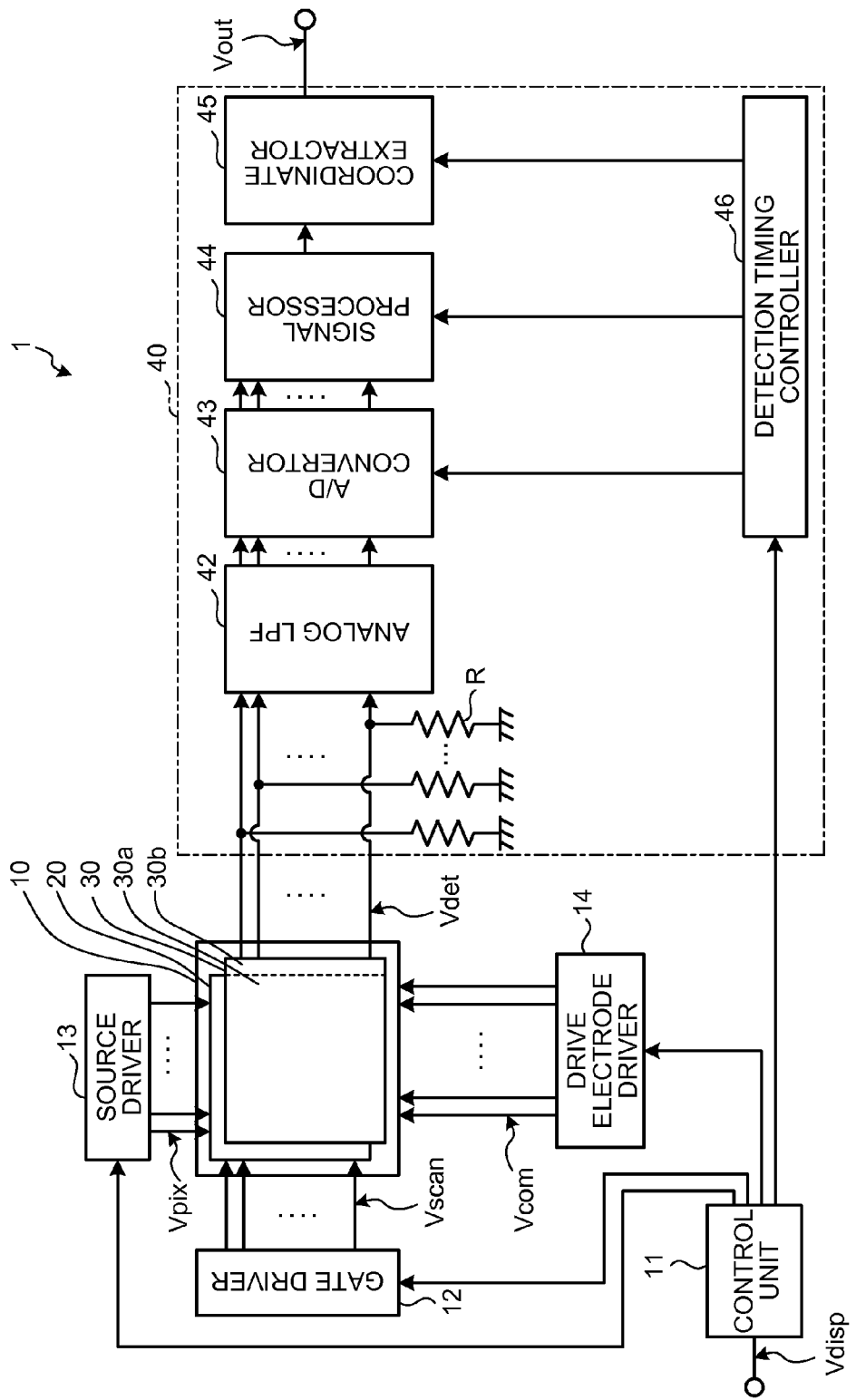
FIG. 2 is a block diagram representing a configuration example of the display device with a touch detection function according to the first embodiment.

FIG. 2 is a block diagram representing a configuration example of the display device with a touch detection function according to the first embodiment. The display device with a touch detection function 1 includes: a display unit with a touch detection function 10; a control unit 11; a gate driver 12; a source driver 13; a drive electrode driver 14; and a touch detection unit 40. The display device with a touch detection function 1 is a display device in which the display unit with a touch detection function 10 incorporates a touch detection function. The display unit with a touch detection function 10 is what is called an in-cell type device in which a liquid crystal display unit 20 using liquid crystal display elements as display elements thereof and a capacitive type touch detection device 30 are integrated together. The display unit with a touch detection function 10 may be what is called an on-cell type device in which the capacitive type touch detection device 30 is mounted on the liquid crystal display unit 20 using liquid crystal display elements as display elements thereof.

The liquid crystal display unit 20 is a device which performs sequential scanning and display one horizontal line at a time in accordance with a scanning signal Vscan supplied by the gate driver 12 as will be described later. The control unit 11 is a circuit which supplies control signals to the gate driver 12, the source driver 13, the drive electrode driver 14, and the touch detection unit 40, respectively, based on an externally-supplied video signal Vdisp so as to control them in such a way that they are operated in a mutually-synchronized manner.

The touch detection device 30 includes: a touch part 30a for performing 2D touch detection; and a button part 30b for performing 0D touch detection. The touch part 30a overlaps a display area of the liquid crystal display unit 20 in a planar view (as viewed from a direction perpendicular to the principal surface of the display unit with a touch detection function 10). The button part 30b is disposed, in a planar view, outside the display area of the liquid crystal display unit 20, e.g., in the frame.

The gate driver 12 has a function of sequentially selecting one horizontal line to be driven for display in the display unit with a touch detection function 10 based on the control signal supplied from the control unit 11.

The source driver 13 is a circuit for supplying an image signal Vpix to each pixel Pix, which will be described later, in the display unit with a touch detection function 10 based on the control signal supplied by the control unit 11.

The drive electrode driver 14 is a circuit for supplying a drive signal Vcom to a drive electrode COM to be described later in the display unit with a touch detection function 10 based on the control signal supplied by the control unit 11.

Basic Principle of Capacitive Type Touch Detection

The touch detection device 30 operates based on the basic principle of the capacitive type touch detection, and outputs a touch detection signal Vdet. In the present disclosure, touch detection is performed with a mutual capacitance method.

Figure 3:
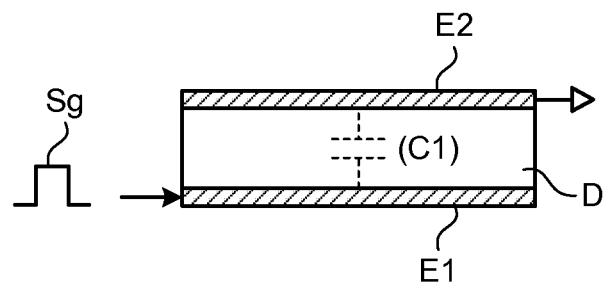
FIG. 3 is an explanatory diagram for explaining the basic principle of a capacitive type touch detection system, representing a state where a finger is neither in contact nor in proximity.
Figure 4:
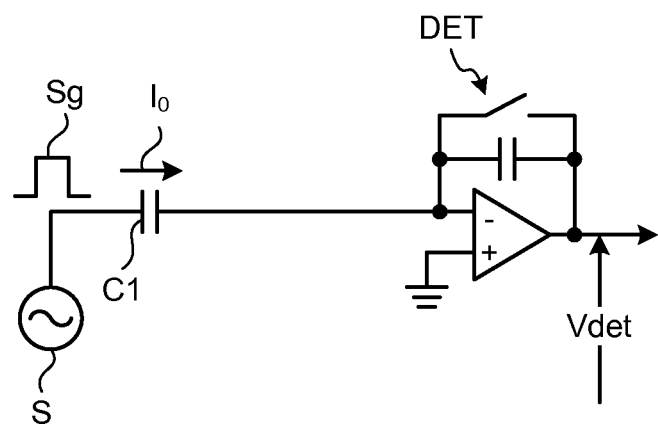
FIG. 4 is an explanatory diagram illustrating an example of an equivalent circuit of the state illustrated in FIG. 3 where a finger is neither in contact nor in proximity.
Figure 5:
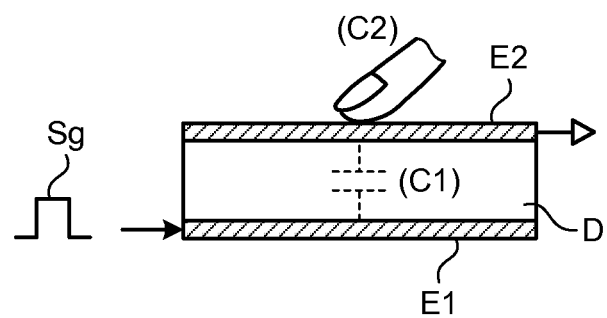
FIG. 5 is an explanatory diagram for explaining the basic principle of the capacitive type touch detection system, representing a state where a finger is in contact or in proximity.
Figure 6:
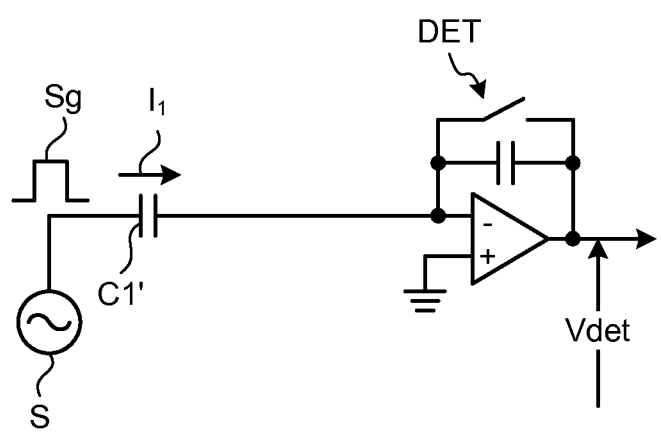
FIG. 6 is an explanatory diagram illustrating an example of an equivalent circuit of the state illustrated in FIG. 5 where a finger is in contact or in proximity.

The basic principle of touch detection in the display device with a touch detection function 1 according to the present embodiment will be described with reference to FIGS. 2 to 7. FIG. 3 is an explanatory diagram for explaining the basic principle of the capacitive type touch detection system, representing a state where a finger is neither in contact nor in proximity. FIG. 4 is an explanatory diagram illustrating an example of an equivalent circuit of the state illustrated in FIG. 3 where a finger is neither in contact nor in proximity. FIG. 5 is an explanatory diagram for explaining the basic principle of the capacitive type touch detection system, representing a state where a finger is in contact or in proximity. FIG. 6 is an explanatory diagram illustrating an example of an equivalent circuit of the state illustrated in FIG. 5 where a finger is in contact or in proximity.

For example, as illustrated in FIGS. 3 and 5, a capacitive element C1 includes a pair of electrodes, a drive electrode E1 and a touch detection electrode E2, disposed so as to face each other with a dielectric D interposed therebetween. As illustrated in FIG. 4, one end of the capacitative element C1 is coupled to an AC signal source (drive signal source) S. The other end thereof is coupled to a voltage detector (touch detection unit) DET. The voltage detector DET is an integration circuit contained in an analog LPF (Low Pass Filter) 42 illustrated in FIG. 2, for example.

If an AC rectangular wave Sg having a predetermined frequency (about several kHz to several hundred kHz, for example) is applied to the drive electrode E1 (one end of the capacitative element C1) from the AC signal source S, an output waveform (touch detection signal Vdet) is emerged through the voltage detector DET coupled to the touch detection electrode E2 (the other end of the capacitative element C1) side. The AC rectangular wave Sg corresponds to a touch drive signal Vcomt to be described later.

Figure 7:
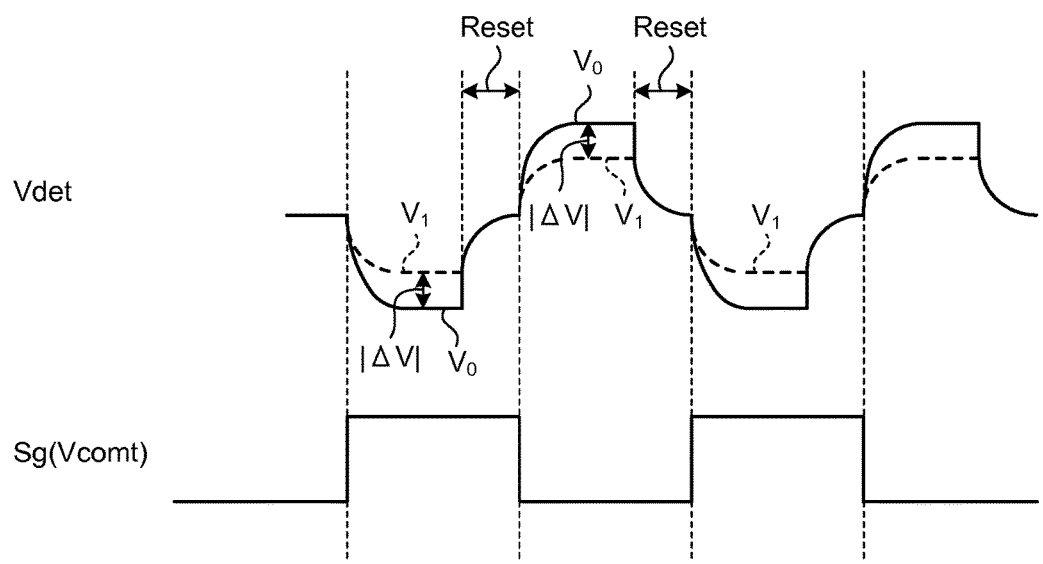
FIG. 7 is a chart representing an example of waveforms of a drive signal and a touch detection signal.

In a state (non-contact state) where a finger is not in contact with (or in proximity to) the device, a current $I_0$ corresponding to a capacitance value of the capacitative element C1 flows along with charge and discharge with respect to the capacitative element C1 as illustrated in FIGS. 3 and 4. As illustrated in FIG. 7, the voltage detector DET converts a fluctuation in the current $I_0$ according to the AC rectangular wave Sg into a voltage fluctuation (solid-line waveform $V_0$).

In a state (contact state) where a finger is in contact with (or in proximity to) the device, on the other hand, capacitance C2 generated by a finger is in contact with or in proximity to the touch detection electrode E2 as illustrated in FIG. 5. As a result, fringe capacitance between the drive electrode E1 and the touch detection electrode E2 is blocked, thereby causing the capacitative element C1 to be functioned as a capacitative element C1' having a capacitance value smaller than that of the capacitative element C1. According to the equivalent circuit illustrated in FIG. 6, a current $I_1$ flows through the capacitative element C1'. As illustrated in FIG. 7, the voltage detector DET converts a fluctuation in the current $I_1$ according to the AC rectangular wave Sg into a voltage fluctuation (dotted-line waveform $V_1$). In this case, the waveform $V_1$ has an amplitude smaller than that of the above-described waveform $V_0$. Thus, an absolute value $|\Delta V|$ of a voltage difference between the waveform $V_0$ and the waveform $V_1$, varies in accordance with an effect caused by an external proximity object such as a finger. In order to detect the absolute value $|\Delta V|$ of the voltage difference between the waveform $V_0$ and the waveform $V_1$ with high accuracy, it is more preferable that the voltage detector DET be operated with a period RESET during which charge and discharge of a capacitor is reset in accordance with the frequency of the AC rectangular wave Sg by means of switching in the circuit.

The touch detection device 30 illustrated in FIG. 2 performs touch detection by sequentially scanning detection blocks one block at a time in accordance with a drive signal Vcom (touch drive signal Vcomt to be described later) supplied from the drive electrode driver 14.

The touch detection device 30 is configured to output the touch detection signals Vdet for respective detection blocks from a plurality of touch detection lines TDL to be described later through the voltage detector DET illustrated in FIG. 4 or FIG. 6, and then supply the touch detection signals Vdet to the A/D convertor 43 in the touch detection unit 40. The touch detection line TDL is made of an ITO (Indium Tin Oxide), for example.

The touch detection unit 40 is a circuit for detecting the presence or absence of a touch (the above-described contact state) with respect to the touch detection device 30 based on the control signal supplied by the control unit 11 and the touch detection signal Vdet supplied by the touch detection device 30 in the display unit with a touch detection function 10 and for obtaining, if touch is detected, the coordinate in the touch-detected area, or the like. The touch detection unit 40 includes: the analog LPF (Low Pass Filter) 42; the A/D convertor 43; a signal processor 44; a coordinate extractor 45; and a detection timing controller 46.

The analog LPF 42 is a low-pass analog filter which uses each of the touch detection signals Vdet supplied by the touch detection device 30 as an input, removes a high-frequency component (noise component) contained in the touch detection signal Vdet to extract a touch component, and outputs the touch component. A resistance R for providing a direct-current potential (0 V) is coupled between each of input terminals of the analog LPF 42 and the ground. In place of this resistance R, a switch may be provided, for example. By turning this switch ON at a predetermined time, the direct-current potential (0 V) may be provided.

The A/D convertor 43 is a circuit for sampling analog signals outputted from the analog LPF 42 at timings synchronized with the touch drive signal Vcomt and converting them into digital signals.

The signal processor 44 includes a digital filter for reducing a frequency component (noise component) contained in the output signal of the A/D convertor 43, excluding the sampling frequency for the touch drive signal Vcomt. The signal processor 44 is a logic circuit for detecting the presence or absence of a touch with respect to the touch detection device 30 based on the output signal from the A/D convertor 43. The signal processor 44 performs a process of taking out only a finger-derived differential signal. The finger-derived differential signal is the above-described absolute value $|\Delta V|$ of the difference between the waveform $V_0$ and the waveform $V_1$. The signal processor 44 may perform an averaging calculation on the absolute values $|\Delta V|$ in one detection block to obtain an average value for the absolute value $|\Delta V|$. As a result, the signal processor 44 can reduce an effect caused by noise. The signal processor 44 compares the detected finger-derived differential signal to a predetermined threshold voltage. If it is greater than or equal to this threshold voltage, it is determined as the contact state by the external proximity object. If it is smaller than the threshold voltage, it is determined as the non-contact state by the external proximity object. In this manner, the touch detection unit 40 can perform touch detection.

The coordinate extractor 45 is a logic circuit for obtaining, when a touch is detected in the signal processor 44, the touch panel coordinate. The detection timing controller 46 controls the A/D convertor 43, the signal processor 44, and the coordinate extractor 45 so as to be operated in synchronization with one another. The coordinate extractor 45 outputs the touch panel coordinate as a signal output Vout.

Modules

Figure 8:
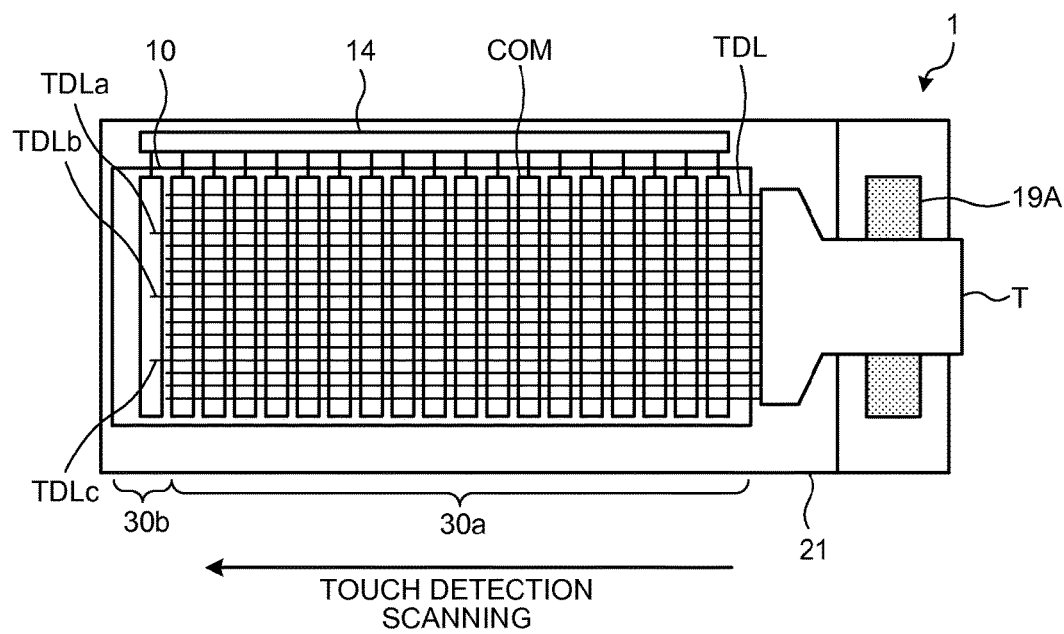
FIG. 8 is a diagram illustrating an example of a module in which the display device with a touch detection function is mounted.
Figure 9:
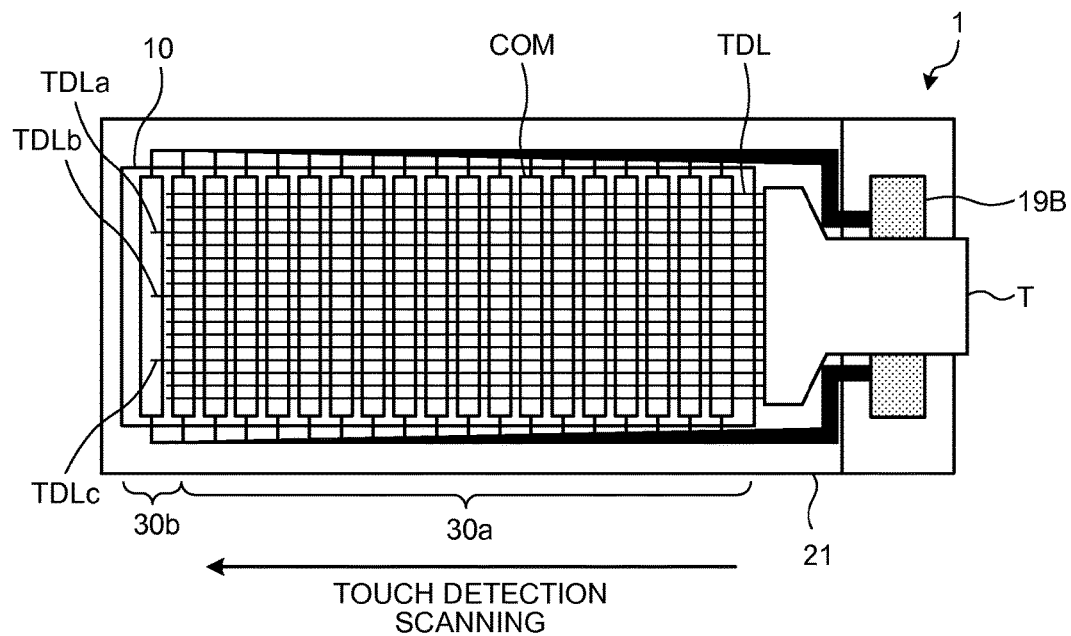
FIG. 9 is a diagram illustrating an example of a module in which the display device with a touch detection function is mounted.

FIGS. 8 and 9 are diagrams each illustrating an example of a module in which the display device with a touch detection function is mounted. As illustrated in FIG. 8, the display device with a touch detection function 1 may form the above-described drive electrode driver 14 on a TFT substrate 21, which is a glass substrate, when mounted in the module.

As illustrated in FIG. 8, the display device with a touch detection function 1 includes: the display unit with a touch detection function 10; the drive electrode driver 14; and a COG (Chip On Glass) 19A. In this display unit with a touch detection function 10, the drive electrodes COM and the touch detection lines TDL formed so as to sterically intersect with the drive electrodes COM are schematically illustrated in a direction perpendicular to the surface of the TFT substrate to be described later. In this example, the drive electrodes COM are formed in a direction of a shorter side of the display unit with a touch detection function 10 and the touch detection lines TDL are formed in a direction of a longer side of the display unit with a touch detection function 10. An output of the touch detection line TDL is provided on the shorter side of the display unit with a touch detection function 10 and coupled to the touch detection unit 40 mounted outside this module via a terminal T formed from flexible printed circuits (FPC) or the like. The drive electrode driver 14 is formed on the TFT substrate 21 which is a glass substrate. The COG 19A is a chip mounted on the TFT substrate 21 and incorporates respective circuits required for display operations such as the control unit 11, the gate driver 12, and the source driver 13 illustrated in FIG. 2.

The display unit with a touch detection function 10 includes the touch part 30a and the button part 30b. In the button part 30b, the drive electrode COM formed in the shorter-side direction is formed in the same manner as in the touch part 30a. Three touch detection lines TDLa to TDLc of the plurality of touch detection lines TDL are extended to the button part 30b. The touch detection lines TDLa to TDLc correspond to the buttons 101b to 101d (see FIG. 1), respectively. Specifically, the touch detection line TDLa corresponds to the button 101b and detects touch input of the "back button." The touch detection line TDLb corresponds to the button 101c and detects touch input of the "home button." The touch detection line TDLc corresponds to the button 101d and detects touch input of the "menu button."

Herein, the three touch detection lines TDLa to TDLc correspond to the buttons 101b to 101d and are extended to the button part 30b. In other words, one touch detection line is extended to the button part 30b for each button. However, two or more touch detection lines may be extended to the button part 30b for each button. This makes it possible to expand the detection range of button touch input, improve the detection sensitivity, and improve the operability of the smartphone 100.

As illustrated in FIG. 9, the display device with a touch detection function 1 may incorporate the drive electrode driver 14 in the COG. As illustrated in FIG. 9, in the display device with a touch detection function 1, the module has a COG 19B. The COG 19B illustrated in FIG. 9 further incorporates the drive electrode driver 14 in addition to the above-described respective circuits required for display operations. During a touch detection operation, the display device with a touch detection function 1 sequentially applies the drive signal Vcom to the drive electrodes COM so as to sequentially scan one detection line at a time. In other words, the display device with a touch detection function 1 performs touch detection scanning parallel to the longer-side direction of the display unit with a touch detection function 10.

The display device with a touch detection function 1 illustrated in FIGS. 8 and 9 outputs the touch detection signal Vdet from the shorter side of the display unit with a touch detection function 10. As a result, the display device with a touch detection function 1 can reduce the number of touch detection lines TDL and thereby facilitate an arrangement of wiring when coupled to the touch detection unit 40 via the terminal T. Since the display device with a touch detection function 1 illustrated in FIG. 9 incorporates the drive electrode driver 14 in the COG 19B, the frame can be narrowed.

In FIGS. 8 and 9, the touch detection scanning direction is defined as a direction moving from the touch part 30a toward the button part 30b. In other words, detection in the touch part 30a is performed first and detection in the button part 30b is performed later. However, the touch detection scanning direction may be defined as a direction moving from the button part 30b toward the touch part 30a. In other words, detection in the button part 30b may be performed first and detection in the touch part 30a may be performed later.

Figure 10:
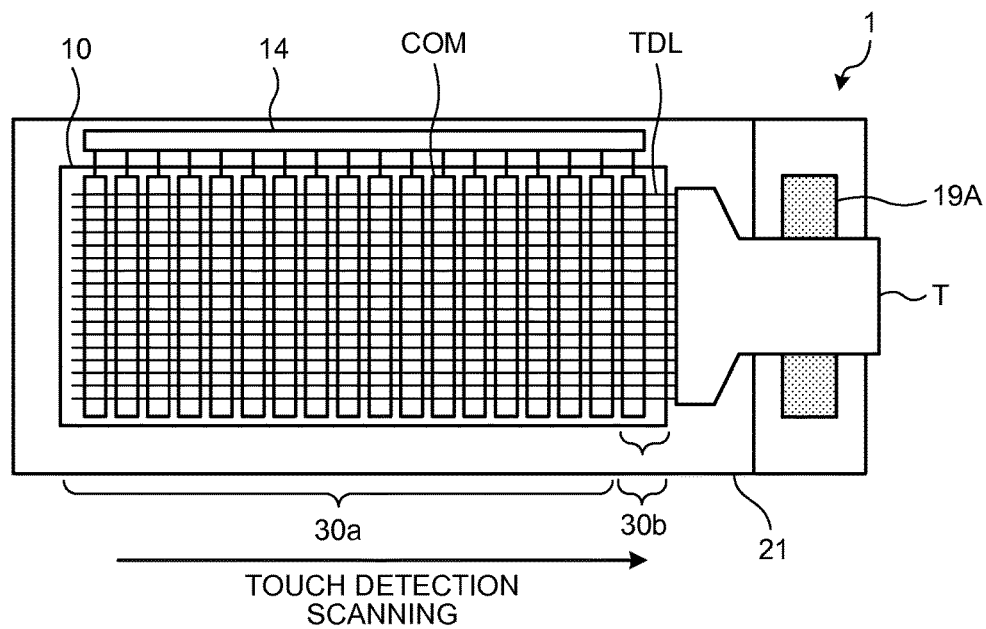
FIG. 10 is a diagram illustrating another example of a module in which the display device with a touch detection function is mounted.
Figure 11:
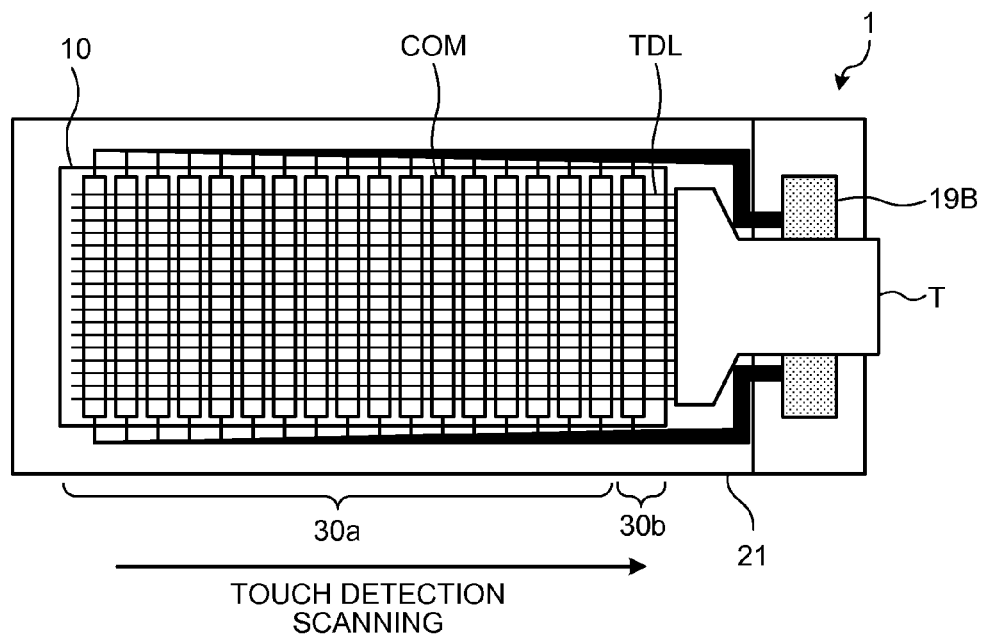
FIG. 11 is a diagram illustrating another example of a module in which the display device with a touch detection function is mounted.

FIGS. 10 and 11 are diagrams illustrating other examples of a module in which the display device with a touch detection function is mounted. In the above-explained modules illustrated in FIGS. 8 and 9, the button part 30b is disposed on the side opposite to the terminal T formed from the flexible printed circuits (FPC) or the like. However, as in the modules illustrated in FIGS. 10 and 11, the button part 30b may be disposed on the terminal T side. Then, since all of the touch detection lines TDL need to be coupled to the terminal T, all of the touch detection lines TDL pass through the button part 30b. In this case, the touch detection unit 40 may detect only the touch detection lines TDL corresponding to the buttons 101b to 101d at a button touch detection timing to be described later.

Display Unit with Touch Detection Function 10

A configuration example of the display unit with a touch detection function 10 will be described next in detail.

Figure 12:
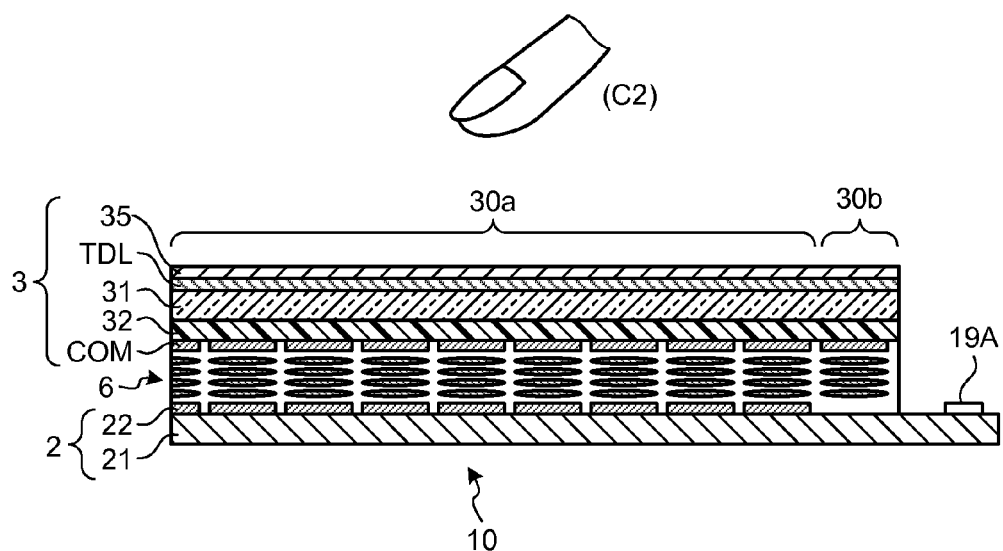
FIG. 12 is a cross-sectional view representing a schematic cross-sectional structure of the display unit with a touch detection function according to the first embodiment.
Figure 13:
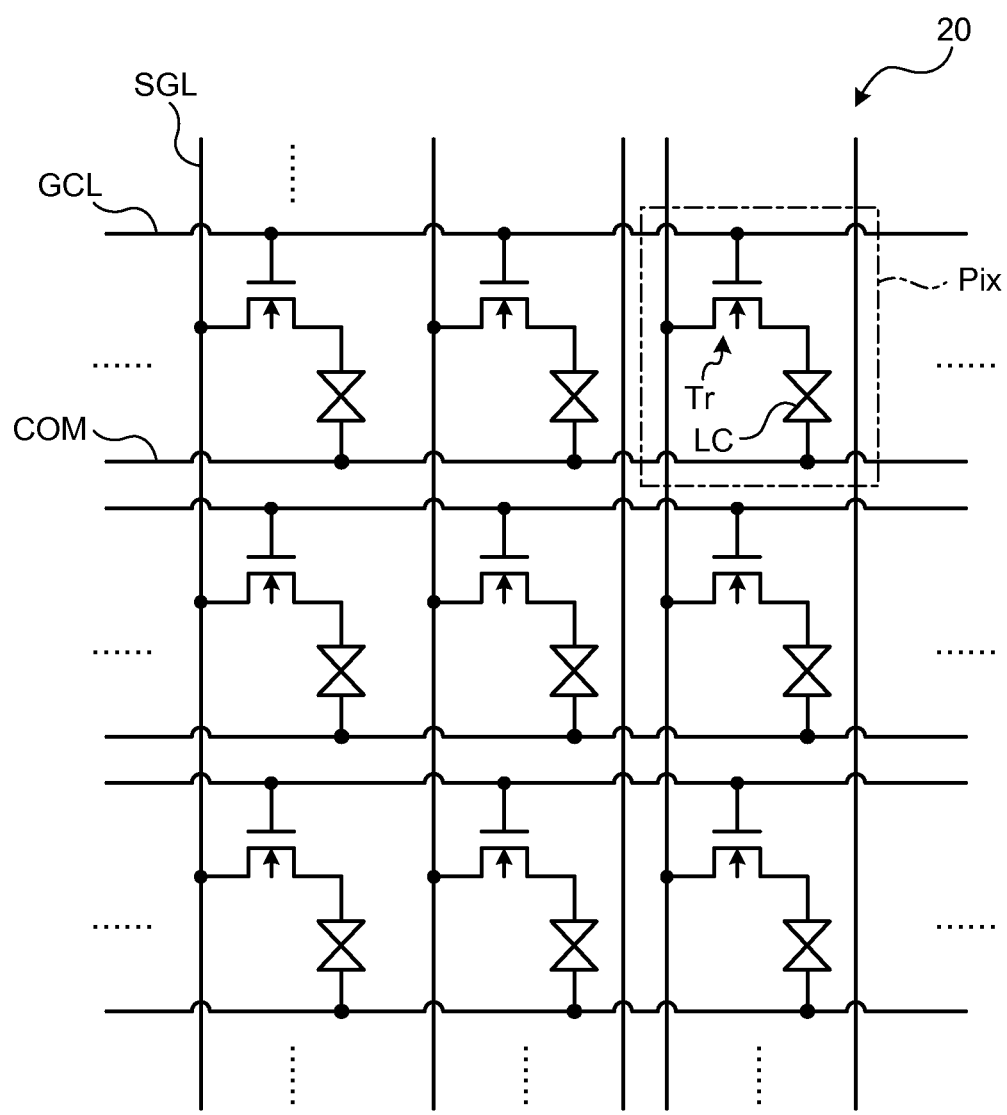
FIG. 13 is a circuit diagram representing a pixel array of the display unit with a touch detection function according to the first embodiment.

FIG. 12 is a cross-sectional view representing a schematic cross-sectional structure of the display unit with a touch detection function according to the first embodiment. FIG. 13 is a circuit diagram representing a pixel array of the display unit with a touch detection function according to the first embodiment. The display unit with a touch detection function 10 includes: a pixel substrate 2; a counter substrate 3 disposed in a facing manner in a direction perpendicular to the surface of the pixel substrate 2; and a liquid crystal layer 6 interposed between the pixel substrate 2 and the counter substrate 3.

A portion of the pixel substrate 2 corresponding to the touch part 30a includes: the TFT substrate 21 as a circuit board; and a plurality of pixel electrodes 22 arranged in a matrix shape on this TFT substrate 21. Thin film transistor (TFT) elements Tr for the respective pixels Pix illustrated in FIG. 13 and wirings such as pixel signal lines SGL for supplying the image signals Vpix to the pixel electrodes 22 and scanning signal lines GCL for driving the respective TFT elements Tr are formed in the TFT substrate 21. In this manner, each pixel signal line SGL extends on a plane parallel to the surface of the TFT substrate 21 and supplies the image signal for displaying an image to the pixels Pix. The liquid crystal display unit 20 illustrated in FIG. 13 has a plurality of pixels Pix arranged in a matrix shape. Each pixel Pix includes the TFT element Tr and a liquid crystal LC. The TFT element Tr is formed by a thin film transistor. In this example, it is formed by an n-channel MOS (Metal Oxide Semiconductor) type TFT. One of the source and drain of the TFT element Tr is coupled to one of the pixel signal lines SGL, and the gate thereof is coupled to one of the scanning signal lines GCL. The other one of the source and drain is coupled to one end of the liquid crystal LC. One end of the liquid crystal LC is coupled to the other one of the source and drain of the TFT element Tr, and the other end thereof is coupled to one of the drive electrodes COM.

Each of the pixels Pix is mutually coupled to other pixels Pix belonging to the same row of the liquid crystal display unit 20 through the scanning signal line GCL. The scanning signal line GCL is coupled to the gate driver 12 and supplied with the scanning signal Vscan by the gate driver 12. Each of the pixels Pix is also mutually coupled to other pixels Pix belonging to the same column of the liquid crystal display unit 20 through the pixel signal line SGL. The pixel signal line SGL is coupled to the source driver 13 and supplied with the image signal Vpix by the source driver 13. Furthermore, each of the pixels Pix is mutually coupled to other pixels Pix belonging to the same row of the liquid crystal display unit 20 by the drive electrode COM. The drive electrode COM is coupled to the drive electrode driver 14 and supplied with the drive signal Vcom by the drive electrode driver 14. In other words, the plurality of pixels Pix belonging to the same row share a single drive electrode COM in this example.

The gate driver 12 illustrated in FIG. 2 applies the scanning signal Vscan to the gates of the TFT elements Tr in the pixels Pix through one of the scanning signal lines GCL illustrated in FIG. 13. Thus, one row (one horizontal line) of the pixels Pix formed in a matrix shape in the liquid crystal display unit 20 is sequentially selected to be driven for display. The source driver 13 illustrated in FIG. 2 supplies the image signal Vpix to each of the pixels Pix through the pixel signal line SGL illustrated in FIG. 13, where the pixels Pix make up one horizontal line sequentially selected by the gate driver 12. Then, display for one horizontal line is performed in these pixels Pix in accordance with the supplied image signal Vpix. The drive electrode driver 14 illustrated in FIG. 2 applies the drive signal Vcom in order to drive the drive electrodes COM for each block consisting of the predetermined number of drive electrodes COM illustrated in FIGS. 12 and 13.

As described above, in the liquid crystal display unit 20, the gate driver 12 drives the scanning signal lines GCL to be line-sequentially scanned in a time-divisional manner, so that one horizontal line is sequentially selected. In the liquid crystal display unit 20, displaying one horizontal line at a time is performed by supplying the image signal Vpix to each of the pixels Pix belonging to the one horizontal line by the source driver 13. When performing this display operation, the drive electrode driver 14 applies the drive signal Vcom to the block containing the drive electrode COM corresponding to that one horizontal line.

The counter substrate 3 includes: a glass substrate 31; a color filter 32 formed on one surface of the glass substrate 31; and the plurality of drive electrodes COM formed on the surface of the color filter 32 opposite to the glass substrate 31. The touch detection lines TDL, each of which is a detection electrode for the touch detection device 30, are formed on the other surface of the glass substrate 31. A polarizer 35 is further provided on this touch detection lines TDL.

For the color filter 32, color filters, which are colored to have three colors of red (R), green (G), and blue (B), for example, are cyclically arranged so as to associate the three colors R, G, and B as one set with the above-described respective pixels Pix illustrated in FIG. 13. The color filter 32 faces the liquid crystal layer 6 in the direction perpendicular to the TFT substrate 21.

The color filter may have a combination of other colors as long as it is colored to have different colors. In the color filter, the luminance in the color region of green (G) is typically higher than those in the color region of red (R) and the color region of blue (B). The color filter may be omitted, and in that case, the display will be white. Alternatively, a light transmissive resin may be used for the color filter to make it white.

The drive electrode COM according to the present embodiment functions as a common drive electrode for the liquid crystal display unit 20 and also as a drive electrode for the touch detection device 30. In the present embodiment, one drive electrode COM is disposed so as to correspond to one pixel electrode 22 (the pixel electrodes 22 constituting one row). The drive electrode COM according to the first embodiment faces the pixel electrode 22 in the direction perpendicular to the surface of the TFT substrate 21 and extends in a direction parallel to the above-described extending direction of the scanning signal line GCL. The drive electrode COM is configured so that the drive signal Vcom is applied to the drive electrode COM by the drive electrode driver 14 via a contact conducting cylinder (not illustrated) having a conductive property.

The liquid crystal layer 6 modulates light passing therethrough according to a state of an electric field thereof. For example, the liquid crystal in various modes such as TN (Twisted Nematic) mode, VA (Vertical Alignment) mode, or ECB (Electrically Controlled Birefringence) mode are used.

Orientation films may be provided between the liquid crystal layer 6 and the pixel substrate 2 and between the liquid crystal layer 6 and the counter substrate 3, respectively. An incident-side polarizer may be disposed on the lower surface side of the pixel substrate 2.

In the portion of the pixel substrate 2 and the counter substrate 3 corresponding to the button part 30b, only detection for button touch input is performed and no image display is performed. Thus, as illustrated in FIG. 12, the drive electrode COM and the touch detection line TDL used for detecting button touch input are formed, and a TFT element Tr, pixel signal line SGL, a scanning signal line GCL, and the like, used for image display are not formed. The color filter 32 in the button part 30b may be black or may be omitted.

Figure 14:
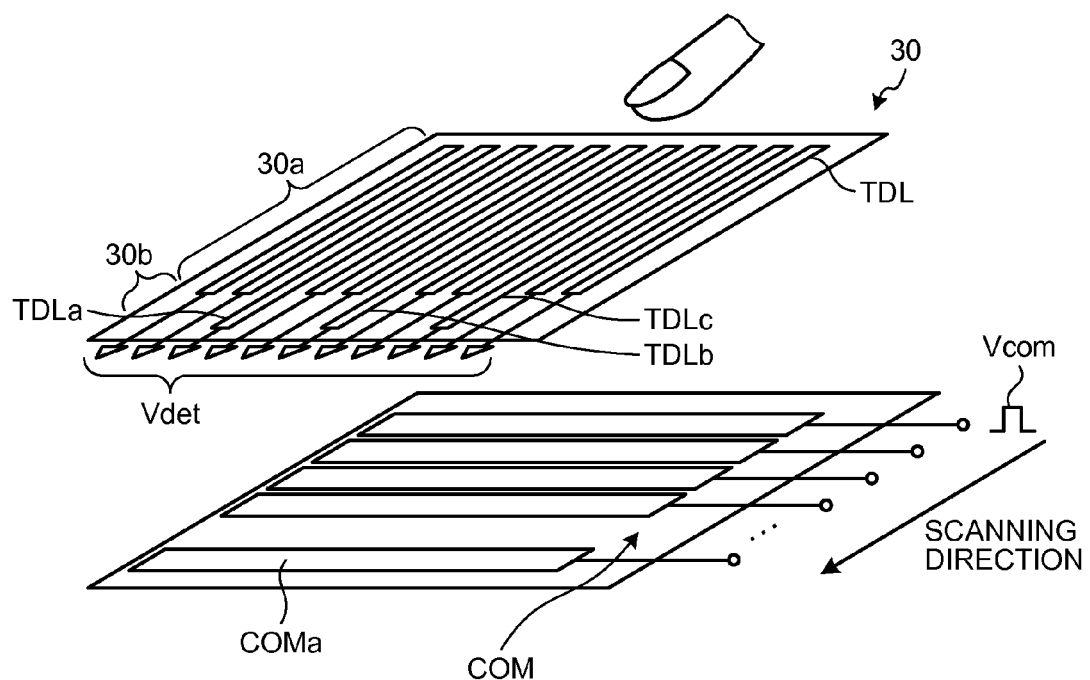
FIG. 14 is a perspective view representing a configuration example of drive electrodes and touch detection lines in the display unit with a touch detection function according to the first embodiment.

FIG. 14 is a perspective view representing a configuration example of the drive electrodes and the touch detection lines in the display unit with a touch detection function according to the first embodiment. The touch detection device 30 is composed of the drive electrodes COM and the touch detection lines TDL provided in the counter substrate 3. The drive electrodes COM have a shape divided into a plurality of stripe-shaped electrode patterns extending in the right-left direction of the figure. When performing a touch detection operation, the drive signal Vcom is sequentially supplied to the respective electrode patterns by the drive electrode driver 14, so that line sequential scanning drive is performed in a time-divisional manner as will be described later. The touch detection lines TDL are composed of stripe-shaped electrode patterns extending in a direction intersecting with the extending direction of the electrode patterns of the drive electrodes COM. The touch detection lines TDL face the drive electrodes COM in the direction perpendicular to the surface of the TFT substrate 21. Each of the electrode patterns of the touch detection lines TDL is coupled to an input of the analog LPF 42 in the touch detection unit 40. The electrode patterns of the drive electrodes COM and the touch detection lines TDL intersecting with each other generate capacitance at each intersection.

With this configuration, in the touch detection device 30 when performing a touch detection operation, the drive electrode driver 14 drives the drive electrode blocks to be line-sequentially scanned in a time-divisional manner. As a result, one detection block of the drive electrodes COM is sequentially selected. By outputting the touch detection signal Vdet from each of the touch detection lines TDL, touch detection for one detection block is performed. In other words, the drive electrode block corresponds to the drive electrode E1 in the above-described basic principle of touch detection, and the touch detection line TDL corresponds to the touch detection electrode E2. Further, the touch detection device 30 detects a touch in accordance with this basic principle. As illustrated in FIG. 14, in the touch part 30a, the electrode patterns intersecting with each other form a capacitive type touch sensor in a matrix shape. Thus, scanning over the entire touch detection surface of the touch detection device 30 makes it possible to detect a contact position or a proximity position of an external proximity object.

As illustrated in FIG. 14, in the button part 30b, one drive electrode COM intersects with the three touch detection lines TDLa to TDLc to configure three capacitive type touch sensors corresponding to the three buttons 101b to 101d. Thus, scanning the touch detection lines TDLa to TDLc also make it possible to detect a contact position or a proximity position of an external proximity object with respect to the three buttons 101b to 101d.

Herein, the TFT substrate 21 corresponds to a specific example of a "first substrate" in the present disclosure. The counter substrate 3 corresponds to a specific example of a "second substrate" in the present disclosure. The pixel electrode 22 corresponds to a specific example of a "pixel electrode" in the present disclosure. The drive electrode COM corresponds to a specific example of a "drive electrode" in the present disclosure. The liquid crystal LC corresponds to a specific example of a "display functional layer" in the present disclosure. The drive electrode driver 14 corresponds to a specific example of a "drive signal supplying circuit" in the present disclosure. The touch detection line TDL corresponds to a specific example of a "touch detection line" in the present disclosure.

1-1B. Operations and Functions

Next, operations and functions of the display device with a touch detection function 1 according to the first embodiment will be described.

The drive electrode COM present in the touch part 30a functions as the common drive electrode for the liquid crystal display unit 20 and also as the drive electrode for the touch detection device 30. Therefore, there is a possibility that the drive signal Vcom influences the both. Thus, the drive signal Vcom is applied to the drive electrode COM separately in a display period B during which a display operation is performed and in a touch detection period A during which a touch detection operation is performed. The drive electrode driver 14 applies the drive signal Vcom as a display drive signal in the display period B during which the display operation is performed. The drive electrode driver 14 applies the drive signal Vcom as a touch drive signal in the touch detection period A during which the touch detection operation is performed. In the following description, the drive signal Vcom used as a display drive signal may be described as a display drive signal Vcomd and the drive signal Vcom used as a touch drive signal may be described as a touch drive signal Vcomt.

As the touch drive signal Vcomt, a signal with an AC rectangular waveform can be used. As the display drive signal Vcomd, a DC voltage signal may be used or an AC rectangular waveform signal may be used.

Outline of Overall Operation

An operation in the portion of the touch part 30a in the display device with a touch detection function 1 will be described first. The control unit 11 supplies control signals to the gate driver 12, the source driver 13, the drive electrode driver 14, and the touch detection unit 40, respectively, based on the externally-supplied video signal Vdisp and controls them to be operated in synchronization with one another. In the display period B, the gate driver 12 supplies the scanning signal Vscan to the liquid crystal display unit 20 and sequentially selects one horizontal line to be driven for display. In the display period B, the source driver 13 supplies the image signal Vpix to the respective pixels Pix making up one horizontal line selected by the gate driver 12.

In the display period B, the drive electrode driver 14 applies the display drive signal Vcomd to the drive electrode block associated with one horizontal line. In the touch detection period A, the drive electrode driver 14 sequentially applies the touch drive signal Vcomt to the drive electrode block associated with the touch detection operation, thereby sequentially selecting one detection block. The display unit with a touch detection function 10 performs a display operation in the display period B based on the signals supplied by the gate driver 12, the source driver 13, and the drive electrode driver 14. The display unit with a touch detection function 10 performs a touch detection operation in the touch detection period A based on the signal supplied by the drive electrode driver 14 and outputs the touch detection signals Vdet from the touch detection lines TDL. The analog LPF 42 amplifies and then outputs the touch detection signals Vdet. The A/D convertor 43 converts the analog signals outputted from the analog LPF 42 into the digital signals at timings synchronized with the touch drive signal Vcomt. The signal processor 44 detects the presence or absence of a touch with respect to the touch detection device 30 based on the output signals from the A/D convertor 43. When a touch is detected in the signal processor 44, the coordinate extractor 45 obtains the touch panel coordinate of the touch. The control unit 11 controls the detection timing controller 46 and changes the sampling frequency of the touch drive signal Vcomt.

An operation in the portion of the button part 30b in the display device with a touch detection function 1 will be described next. Since the button part 30b of the display device with a touch detection function 1 does not perform display, it is only necessary to be operated during the touch detection period A without being operated during the display period B. Specifically, the display unit with a touch detection function 10 performs a touch detection operation in the touch detection period A based on the signal supplied by the drive electrode driver 14 and outputs the touch detection signals Vdet from the touch detection lines TDL. The analog LPF 42 amplifies and then outputs the touch detection signals Vdet. The A/D convertor 43 converts the analog signals outputted from the analog LPF 42 into the digital signals at timings synchronized with the touch drive signal Vcomt. The signal processor 44 detects the presence or absence of a touch with respect to the touch detection device 30 based on the output signals from the A/D convertor 43. When a touch is detected in the signal processor 44, the coordinate extractor 45 determines if the touched button is the button 101b (see FIG. 1, corresponding to the "back button"), the button 101c (corresponding to the "home button"), or the button 101d (corresponding to the "menu button"). The control unit 11 controls the detection timing controller 46 and changes the sampling frequency of the touch drive signal Vcomt.

Detailed Operations

Figure 15:
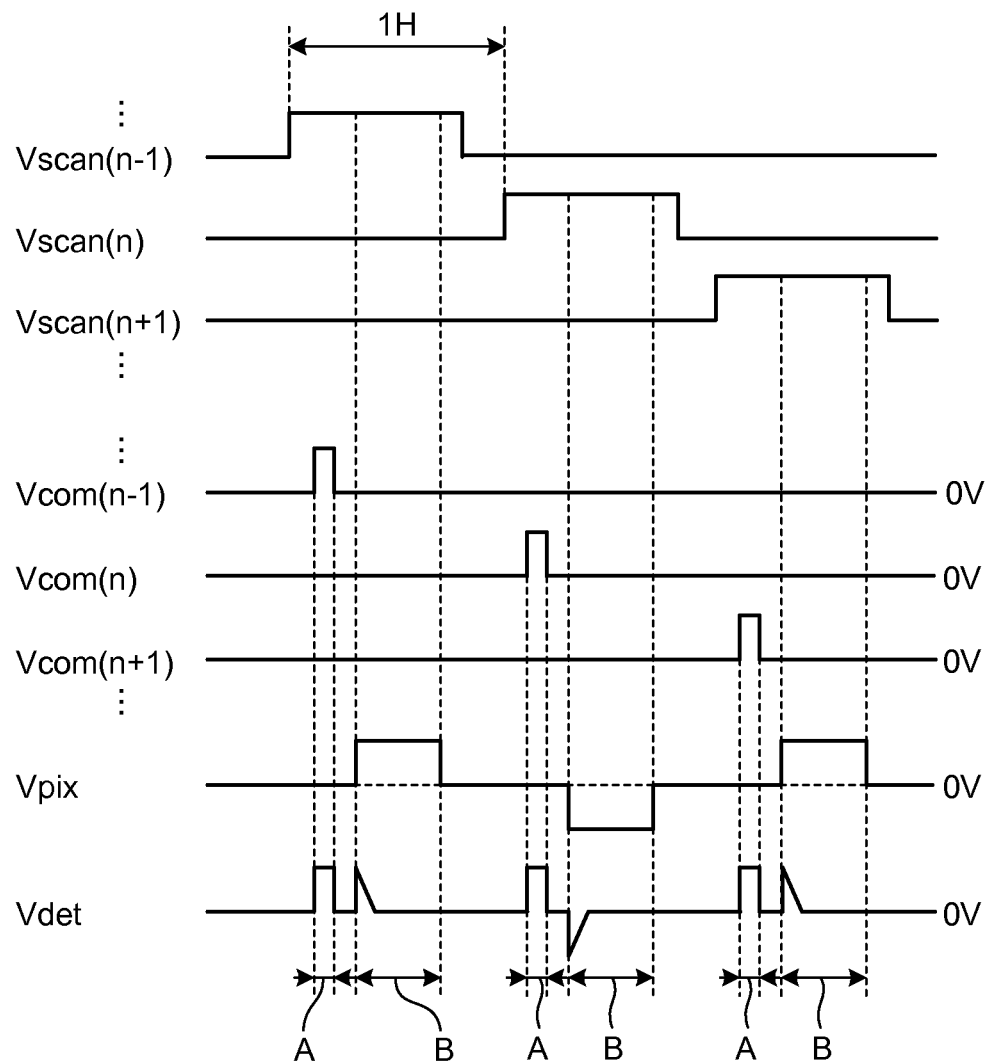
FIG. 15 is a timing waveform chart representing an operation example of the display device with a touch detection function according to the first embodiment.

Detailed operations of the display device with a touch detection function 1 will be described next. An operation in the portion of the touch part 30a in the display device with a touch detection function 1 will be described first. FIG. 15 is a timing waveform chart representing an operation example of the display device with a touch detection function according to the first embodiment. As illustrated in FIG. 15, the liquid crystal display unit 20 sequentially scans the adjacent scanning signal lines GCL in the (n−1)th row, the n-th row, and the (n+1)th row of the scanning signal lines GCL one horizontal line at a time according to the scanning signal Vscan supplied by the gate driver 12 and performs display. Similarly, the drive electrode driver 14 supplies the drive signal Vcom to the adjacent ones in the (n−1)th row, the n-th row, and the (n+1)th row of the drive electrodes COM in the display unit with a touch detection function 10 based on the control signal supplied by the control unit 11.

In the display device with a touch detection function 1, the touch detection operation (touch detection period A) and the display operation (display period B) are performed in a time-divisional manner for every one display horizontal period (1H). In the touch detection operation, a different drive electrode COM is selected for every one display horizontal period 1H and the touch detection drive signal Vcomt is applied thereto to thereby perform touch detection scanning. The operation thereof will be described below in detail.

First, the gate driver 12 applies the scanning signal Vscan to the scanning signal line GCL in the (n−1)th row, thereby changing the scanning signal Vscan(n−1) from low level to high level. One display horizontal period 1H is thereby started.

Next, in the touch detection period A, the drive electrode driver 14 applies the touch drive signal Vcomt to the drive electrode COM in the (n−1)th row, thereby changing the drive signal Vcom(n−1) from low level to high level. This drive signal Vcom(n−1) is transmitted to each of the touch detection lines TDL via the capacitance, thereby changing the touch detection signal Vdet. Next, when the drive signal Vcom(n−1) is changed from high level to low level, the touch detection signal Vdet is changed similarly. This waveform of the touch detection signal Vdet in the touch detection period A corresponds to the touch detection signal Vdet in the above-described basic principle of touch detection. The touch detection unit 40 performs touch detection by performing A/D conversion on each of touch detection signals Vdet in the touch detection period A. Thus, touch detection for one detection line is performed in the display device with a touch detection function 1.

Next, in the display period B, the source driver 13 applies the image signal Vpix to each of the pixel signal lines SGL to perform display for one horizontal line. As illustrated in FIG. 15, this change in the image signal Vpix may be transmitted to the touch detection line TDL via the parasitic capacitance, thereby changing the touch detection signal Vdet. However, by keeping the A/D convertor 43 from performing A/D conversion in the display period B, an effect of this change in the image signal Vpix on touch detection can be suppressed. After the supply of the image signal Vpix by the source driver 13 is ended, the gate driver 12 changes the scanning signal Vscan(n−1) for the scanning signal line GCL in the (n−1)th row from high level to low level, thereby ending one display horizontal period (1H).

In the display period B, the drive electrode driver 14 applies the display drive signal Vcomd to the selected drive electrode COM. In this example, a DC voltage at 0 V is applied as Vcomd in the display period B.

In other words, in this example, the touch drive signal Vcomt is a rectangular wave signal having a low-level portion and a high-level portion, and the display drive signal Vcomd is a DC voltage signal at the same level as the low level of the touch drive signal Vcomt.

In this example, the drive electrode driver 14 applies the DC voltage signal at the same level as the display drive signal Vcomd to the drive electrode COM also in a period during which it is not selected by the gate driver 12. However, the drive electrode COM may be in a floating state without the voltage signal applied thereto in a period during which it is not selected by the gate driver 12.

Next, the gate driver 12 applies the scanning signal Vscan to the scanning signal line GCL in the n-th row, which is different from the previous scanning signal line GCL, thereby changing the scanning signal Vscan(n) from low level to high level. Next one display horizontal period (1H) is thereby started.

In the next touch detection period A, the drive electrode driver 14 applies the drive signal Vcom to the drive electrode COM in the n-th row, which is different from the previous drive electrode COM. The touch detection unit 40 performs A/D conversion on a change in each of the touch detection signals Vdet, thereby performing touch detection for this one detection line.

Next, in the display period B, the source driver 13 applies the image signal Vpix to each of the pixel signal lines SGL to perform display for one horizontal line. Since the display device with a touch detection function 1 according to the present embodiment performs inversion drive, the image signal Vpix applied by the source driver 13 has a polarity inverted from that of the previous one display horizontal period (1H). After this display period B is ended, this one display horizontal period (1H) is ended.

Subsequently, by repeating the above-described operations, the display device with a touch detection function 1 performs the display operation by means of scanning over the entire display screen and performs the touch detection operation by means of scanning over the entire touch detection surface.

As described above, in the display device with a touch detection function 1, the touch detection operation is performed in the touch detection period A and the display operation is performed in the display period B in one display horizontal period (1H). Since the touch detection operation and the display operation are thus performed in the different periods, both of the display operation and the touch detection operation can be performed in the same one display horizontal period. It is also possible to suppress the effect of the display operation on the touch detection.

Note that the display device with a touch detection function 1 does not necessarily have to perform the touch detection operation and the display operation in a time-divisional manner in one display horizontal period (1H). It can arbitrarily set the touch detection period A and the display period B in one frame period during which display for one screen is performed to perform the touch detection operation and the display operation in a time-divisional manner.

In other words, the display device with a touch detection function 1 may perform screen display and touch detection for one screen by repeating a display operation for a plurality of horizontal lines and a touch detection operation for a plurality of lines. Alternatively, touch detection for one screen or less or one screen or more may be performed during the display operation for one screen. Alternatively, the display operation for one screen and the touch detection operation for one screen may be repeated.

Next, an operation in the portion of the button part 30*b* in the display device with a touch detection function 1 will be described. Since the button part 30*b* of the display device with a touch detection function 1 does not perform display, it is only necessary to be operated during the touch detection period A without being operated during the display period B. Specifically, the drive electrode driver 14 supplies the drive signal Vcomt to a drive electrode COMa (see FIG. 14) of the plurality of drive electrodes COM, which is present in the button part 30*b*, based on the control signal supplied by the control unit 11. The drive electrode driver 14 can also drive the drive electrode COMa present in the button part 30*b* and the other drive electrodes COM present in the touch part 30*a* in a parallel manner or in a time-divisional manner. If the drive electrode driver 14 applies the drive signal Vcomt to the drive electrode COMa present in the button part 30*b* in the touch detection period A as described above, the drive signal Vcom is changed from low level to high level. This drive signal Vcomt is transmitted to the touch detection lines TDLa (corresponding to the button 101*b*), TDLb (corresponding to the button 101*c*), and TDLc (corresponding to the button 101*d*) via the capacitances, thereby changing the touch detection signals Vdet. Next, when the drive signal Vcomt is changed from high level to low level, the touch detection signals Vdet are changed similarly. The waveforms of the touch detection signals Vdet in the touch detection period A correspond to the touch detection signal Vdet in the above-described basic principle of touch detection. The touch detection unit 40 performs touch detection by performing A/D conversion on the touch detection signals Vdet in the touch detection period A.

Thus, button touch detection in the button part 30*b* is performed in the display device with a touch detection function 1.

As described above, according to the display device with a touch detection function 1 in the present embodiment, the buttons 101*b* to 101*d* can be implemented by the button part 30*b* of the touch detection device 30. This makes it possible to eliminate a need to provide dedicated FPC, touch sensor, touch button, and the like in order to implement the buttons 101*b* to 101*d*. Therefore, the display device with a touch detection function 1 can suppress an increase in the number of components, suppress an increase in the manufacturing steps, and achieve a cost reduction with a simple circuit configuration.

In the display device with a touch detection function 1, the drive electrode COMa in the button part 30*b*, in which the detection electrodes TDL for the touch part 30*a* can be used also for the button part 30*b*, can be formed in the same layer and in the same step as the drive electrodes COM in the touch part 30*a*. The display device with a touch detection function 1 can thus suppress an increase in the manufacturing steps, thereby being able to suppress an increase in the cost. The drive electrodes COM in the touch part 30*a* and the drive electrode COMa in the button part 30*b* can be operated by sequentially applying the drive signal thereto by the drive electrode driver 14. The display device with a touch detection function 1 can thus suppress an increase in circuits, thereby being able to suppress an increase in the cost. The display device with a touch detection function 1 can perform touch detection by employing the detection principle of the mutual capacitance method both in the touch part 30*a* and in the button part 30*b*.

Even in a case where 2D touch input detection and image display are not performed, e.g., in a case where the smartphone 100 is in a sleep mode, or the like, the display device with a touch detection function 1 can perform 0D button touch input detection by selecting and driving only the drive electrode COMa in the button part 30*b*. Thus, in the display device with a touch detection function 1, 0D button touch input can be used as a trigger for bringing the smartphone 100 from a sleep mode to a normal operation mode, for example, and the operability of the smartphone 100 can be thereby improved while suppressing the power consumption.

The display device with a touch detection function 1 has been described with an example in which the present embodiment is applied to TN mode, VA mode, ECB mode, or the like. However, the present embodiment can be applied also to FFS (Fringe Field Switching) mode, IPS (In Plane Switching) mode, or the like.

In other words, the drive electrodes COM and COMa may be formed above the pixel substrate 2. More specifically, they may have a structure (corresponding to FFS mode) in which the drive electrodes COM and COMa and the pixel electrodes are layered above the pixel substrate 2 via an insulating layer interposed therebetween or a structure (corresponding to IPS mode) in which the drive electrodes COM and COMa and the pixel electrodes are arranged in an alternate manner in the same plane above the pixel substrate 2.

1-2. Second Embodiment

In the first embodiment, the touch part 30a for performing 2D touch detection and the button part 30b for performing 0D button touch detection share the touch detection line TDL. However, a touch detection electrode for performing button touch detection in the button part 30b may be separately provided.

Figure 16:
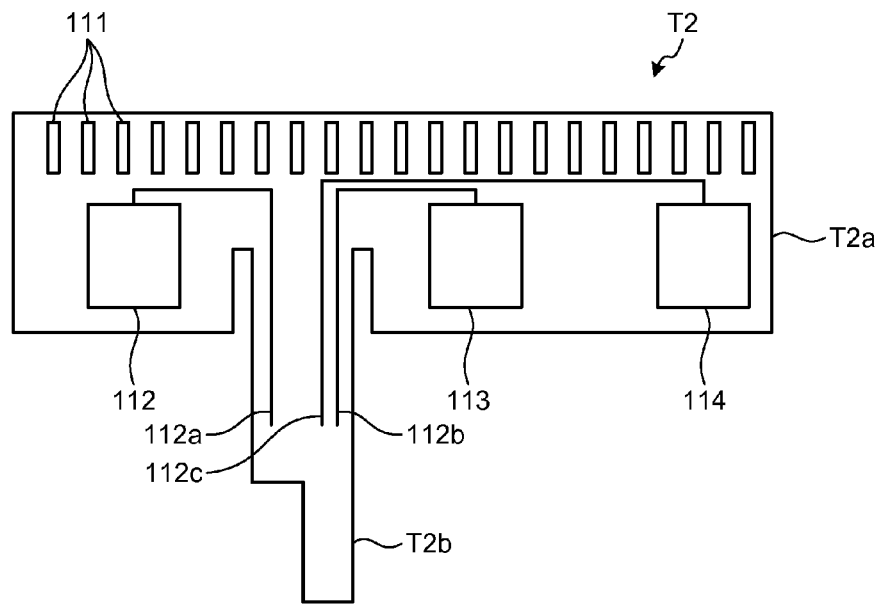
FIG. 16 is a diagram illustrating a terminal according to a second embodiment.

FIG. 16 is a diagram illustrating a terminal according to the second embodiment. As illustrated in FIG. 16, a terminal T2 formed from a flexible printed circuit and the like includes: a first portion T2a having a generally rectangular shape extending in the horizontal direction in the figure; and a second portion T2b extending in the downward direction in the figure from a portion slightly offset from a central portion of the first portion T2a toward the left side in the figure.

Along a longitudinal side (the upper side in the figure) of the first portion T2a of the terminal T2, a plurality of terminals 111 to be coupled to a plurality of touch detection lines TDL, respectively, are provided. The terminals 111 are coupled to the touch detection unit 40 via wirings (not illustrated) formed in the terminal T2. The touch detection unit 40 is thus coupled to the plurality of touch detection lines TDL, thereby being able to detect 2D touch input.

Touch detection electrodes 112 to 114 are formed on the principal surface (the surface on the nearer side of the paper plane) of the terminal T2 so as to correspond to the three buttons 101b to 101d. The touch detection electrodes 112 to 114 are coupled to wirings 112a to 112c formed on the principal surface of the terminal T2, respectively. The wirings 112a to 112c are coupled to the touch detection unit 40. The touch detection unit 40 is thus coupled to the three touch detection electrodes 112 to 114, thereby being able to detect 0D button touch input.

Figure 17:
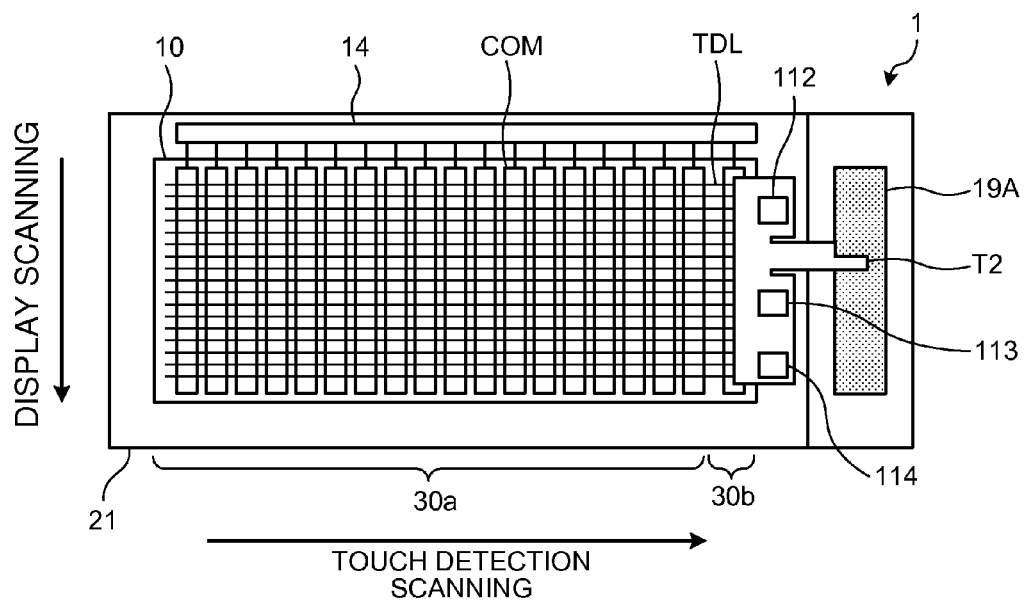
FIG. 17 is a diagram illustrating an example of a module in which a display device with a touch detection function according to the second embodiment is mounted.

FIG. 17 is a diagram illustrating an example of a module in which a display device with a touch detection function according to the second embodiment is mounted. As illustrated in FIG. 17, the display unit with a touch detection function 10 has the button part 30b on the side of the COG 19A and the touch part 30a on the side opposite to the COG 19A. The terminal T2 is disposed in an upper layer (the nearer side of the paper plane) of the button part 30b. The touch detection electrodes 112 to 114 formed on the terminal T2 constitute three capacitive type touch sensors in combination with the drive electrode COM formed in the button part 30b.

Figure 18:
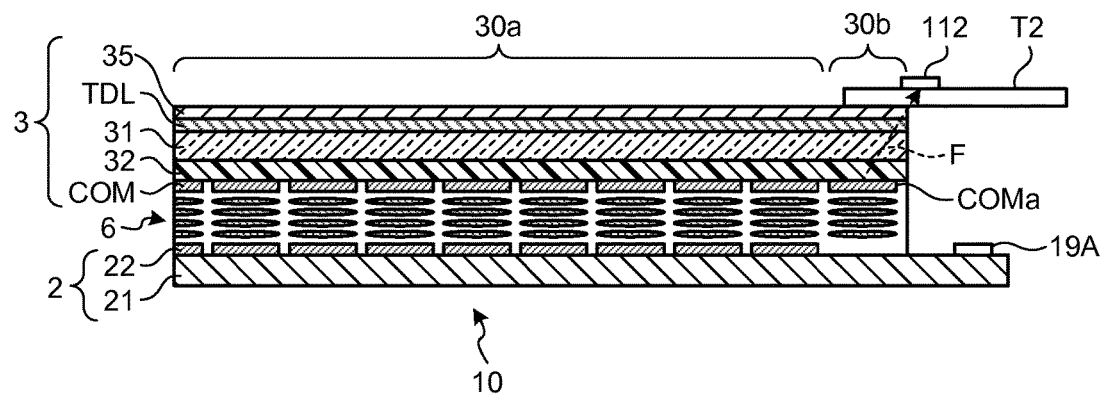
FIG. 18 is a cross-sectional view representing a schematic cross-sectional structure of the display unit with a touch detection function according to the second embodiment.

FIG. 18 is a cross-sectional view representing a schematic cross-sectional structure of the display unit with a touch detection function according to the second embodiment. The display unit with a touch detection function 10 includes: the pixel substrate 2; the counter substrate 3 disposed in a facing manner in a direction perpendicular to the surface of the pixel substrate 2; and the liquid crystal layer 6 interposed between the pixel substrate 2 and the counter substrate 3.

A portion of the pixel substrate 2 corresponding to the touch part 30a includes: the TFT substrate 21 as a circuit board; and the plurality of pixel electrodes 22 arranged in a matrix shape on this TFT substrate 21. The counter substrate 3 includes: the glass substrate 31; the color filter 32 formed on one surface of the glass substrate 31; and the plurality of drive electrodes COM formed on the surface of the color filter 32 opposite to the glass substrate 31. The touch detection lines TDL, each of which is a detection electrode of the touch detection device 30, are formed on the other surface of the glass substrate 31. The polarizer 35 is further provided on this touch detection lines TDL.

The drive electrode COM according to the present embodiment functions as a common drive electrode for the liquid crystal display unit 20 and also as a drive electrode for the touch detection device 30. In the present embodiment, one drive electrode COM is disposed so as to correspond to one pixel electrode 22 (the pixel electrodes 22 constituting one row). The drive electrode COM according to the present embodiment faces the pixel electrode 22 in the direction perpendicular to the surface of the TFT substrate 21 and extends in a direction parallel to the above-described extending direction of the pixel signal line SGL. The drive electrode COM is configured so that the drive signal Vcom is applied to the drive electrode COM by the drive electrode driver 14 via the contact conducting cylinder (not illustrated) having a conductive property.

In the portion of the pixel substrate 2 and the counter substrate 3 corresponding to the button part 30b, only detection for button touch input is performed and no image display is performed. Thus, as illustrated in FIG. 18, only the drive electrode COMa used for detecting button touch input is formed therein. TFT elements Tr, pixel signal lines SGL, the scanning signal lines GCL, and the like used for image display are not formed.

An electric field F is exerted from the drive electrode COMa in the button part 30b toward the touch detection electrode 112 on the terminal T2 in a direction from the lower left in the figure to the upper right in the figure. The display unit with a touch detection function 10 can detect button touch input on the button part 30b due to the electric field F.

According to the present embodiment, forming the touch detection electrodes 112 to 114 for the 0D buttons on the terminal T2 allows the touch detection electrodes 112 to 114 to be formed with a large size. This makes it possible to strengthen the electric field formed between the drive electrode COMa in the button part 30b and the detection electrodes 112 to 114 in the button part 30b. Thus, the display device with a touch detection function 1 can expand the detection range of button touch input, improve the detection sensitivity, and improve the operability of the smartphone 100.

The drive electrode COMa for detecting 0D button touch input can be formed in the same layer and in the same step as the drive electrodes COM for performing 2D touch input detection and image display. The display device with a touch detection function 1 can thus suppress an increase in the manufacturing steps, thereby being able to suppress an increase in the cost.

Furthermore, the drive electrode COMa in the button part 30b and the drive electrodes COM in the touch part 30a can share a drive signal supplying circuit (the drive electrode driver 14 or the like) for supplying a drive signal for touch detection thereto and the drive electrode COMa and the drive electrodes COM can be sequentially selected to be supplied with the drive signal. Thus, dedicated drive circuits can be diminished or reduced, thereby being able to suppress an increase in the cost.

In the display device with a touch detection function 1, the touch detection lines TDL for 2D touch input detection and the touch detection electrodes 112 to 114 for 0D button touch input detection are separately provided. As a result, even in a case where 2D touch input detection and image display are not performed, e.g., in a case where the smartphone 100 is in a sleep mode, or the like, 0D button touch input detection can be performed. Thus, in the display device with a touch detection function 1, 0D button touch input can be used as a trigger for bringing the smartphone 100 from a sleep mode to a normal operation mode, for example, and the operability of the smartphone 100 can be thereby improved while suppressing the power consumption.

In the display device with a touch detection function 1, the touch detection lines TDL for 2D touch input detection and the touch detection electrodes 112 to 114 for 0D button touch input detection are separately provided. As a result, the 2D touch input detection and the 0D button touch input detection can be easily performed in parallel or simultaneously, and the detection accuracy can be enhanced. Thus, the display device with a touch detection function 1 can reduce delay in the 0D button touch input detection, thereby being able to improve the operability of the smartphone 100.

The display device with a touch detection function 1 has been described with an example in which the present embodiment is applied to TN mode, VA mode, ECB mode, or the like. However, the present embodiment can be applied also to FFS mode, IPS mode, or the like.

1-3. Third Embodiment

Typically, an electronic apparatus employing a liquid crystal display unit often has a cover glass disposed as an upper layer of a liquid crystal display panel in view of protecting the liquid crystal display panel, improving the contrast thereof, and the like. Thus, a touch detection electrode for a 0D button may be disposed on a back surface of the cover glass (the surface of the cover glass on the liquid crystal display panel side).

Figure 19:
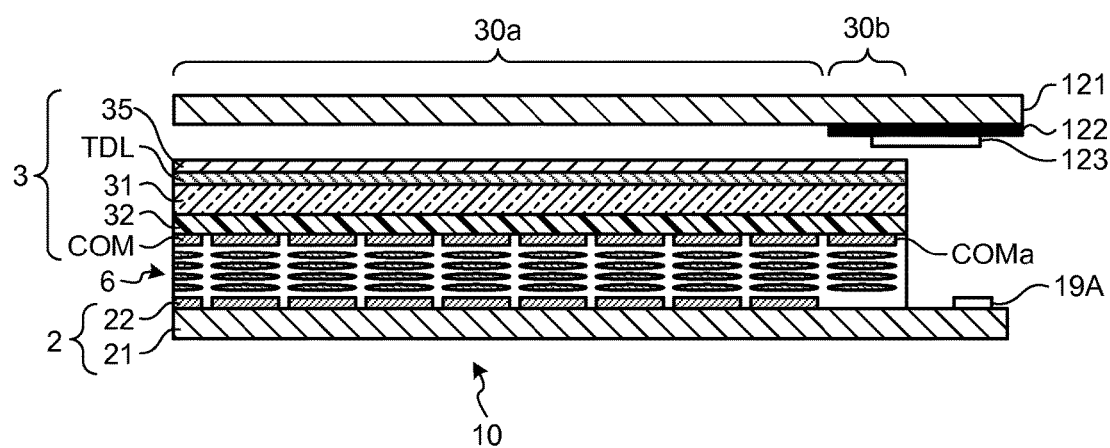
FIG. 19 is a cross-sectional view representing a schematic cross-sectional structure of a display unit with a touch detection function according to a third embodiment.

FIG. 19 is a cross-sectional view representing a schematic cross-sectional structure of a display unit with a touch detection function according to the third embodiment. In the portion of the pixel substrate 2 and the counter substrate 3 corresponding to the button part 30b, only detection for button touch input is performed and no image display is performed. Thus, as illustrated in FIG. 19, only the drive electrode COMa used for detecting button touch input is formed therein. TFT elements Tr, pixel signal lines SGL, scanning signal lines GCL, and the like used for image display are not formed.

As illustrated in FIG. 19, a cover glass 121 is disposed in a facing manner in a direction perpendicular to the surface of the display unit with a touch detection function 10 in view of protecting the display unit with a touch detection function 10, etc. A light-shielding layer 122 is formed on the back surface (the surface on the side of the display unit with a touch detection function 10) of the cover glass 121. A touch detection electrode 123 for detecting 0D button touch input is formed on the light-shielding layer 122 (on the side of the display unit with a touch detection function 10). Since the touch detection electrode 123 is hidden behind the light-shielding layer 122 as viewed from the line of sight by a user, it can be made difficult to be visually recognized by the user.

According to the present embodiment, forming the touch detection electrode 123 for 0D buttons on the back surface of the cover glass 121 allows the touch detection electrode 123 to be formed with a larger size. Thus, the display device with a touch detection function 1 can expand the detection range of button touch input, improve the detection sensitivity, and improve the operability of the smartphone 100. Since a distance between the touch detection electrode 123 and a finger, stylus, or the like can be reduced, the display device with a touch detection function 1 can improve the detection sensitivity and the operability of the smartphone 100.

Even in a case where 2D touch input detection and image display are not performed, e.g., in a case where the smartphone 100 is in a sleep mode, or the like, the display device with a touch detection function 1 can perform 0D button touch input detection by selecting and driving the drive electrode COMa in the button part 30b. Thus, in the display device with a touch detection function 1, 0D button touch input can be used as a trigger for bringing the smartphone 100 from a sleep mode to a normal operation mode, for example, and the operability of the smartphone 100 can be thereby improved while suppressing the power consumption.

The display device with a touch detection function 1 has been described with an example in which the present embodiment is applied to TN mode, VA mode, ECB mode, or the like. However, the present embodiment can be applied also to FFS mode, IPS mode, or the like.

1-4. Fourth Embodiment

Typically, an electronic apparatus employing a liquid crystal display unit often includes a backlight for irradiating a liquid crystal display panel from the back surface of the liquid crystal display panel in view of improving the visibility and color representation thereof. Thus, 0D buttons may be irradiated with the backlight from the back surfaces of the 0D buttons.

Figure 20:
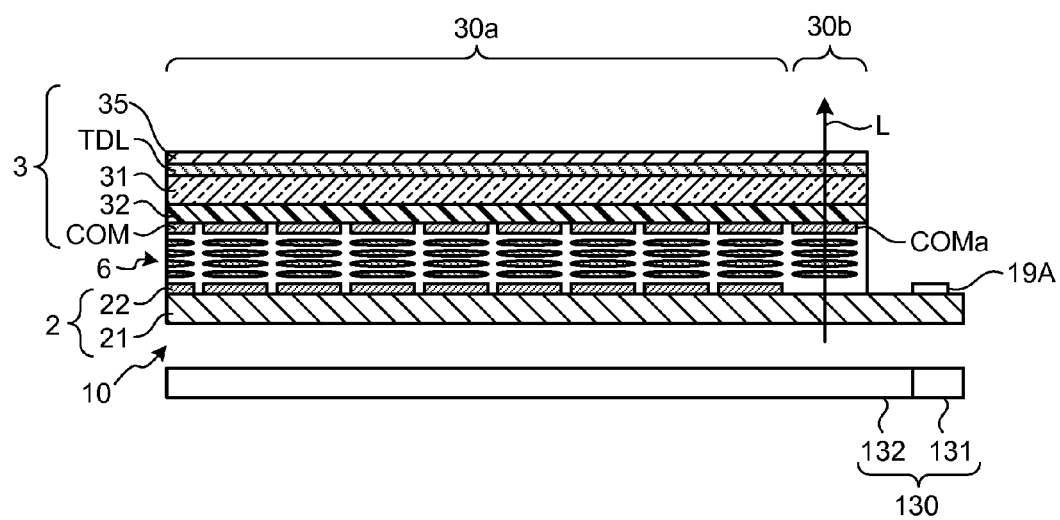
FIG. 20 is a cross-sectional view representing a schematic cross-sectional structure of a display unit with a touch detection function according to a fourth embodiment.

FIG. 20 is a cross-sectional view representing a schematic cross-sectional structure of a display unit with a touch detection function according to the fourth embodiment. In the portion of the pixel substrate 2 and the counter substrate 3 corresponding to the button part 30b, only detection for button touch input is performed and no image display is performed. Thus, as illustrated in FIG. 20, only the drive electrode COMa used for detecting button touch input is formed therein. TFT elements Tr, pixel signal lines SGL, scanning signal lines GCL, and the like used for image display are not formed.

As illustrated in FIG. 20, a backlight 130 is disposed on the back side (the lower side in the figure) of the display unit with a touch detection function 10 in view of improving the visibility and color representation thereof. The backlight 130 includes: a light source 131 such as an LED (Light Emitting Diode) or a cold-cathode tube; and a light guide plate 132 for diffusing light emitted from the light source 131 through the entire display unit with a touch detection function 10 and changing the traveling direction of light to a direction traveling from the pixel substrate 2 toward the counter substrate 3. The light emitted from the light guide plate 132 irradiates the touch part 30a from the back surface (the surface on the backlight 130 side) thereof and irradiates the button part 30b from the back surface (the surface on the backlight 130 side) thereof.

In other words, light L emitted from the button part 30b of the light guide plate 132 sequentially passes through the drive electrode COMa, the color filter 32, the glass substrate 31, the touch detection line TDL, and the polarizer 35 in the button part 30b.

According to the present embodiment, irradiating the button part 30b from the back surface thereof with the backlight 130 makes it possible to improve the visibility of the button part 30b. Thus, the display device with a touch detection function 1 can improve the operability of the smartphone 100.

In the display device with a touch detection function 1, by forming a transmissive portion with a shape such as characters, graphics, symbols, or icons representing the "back button," the "home button," the "menu button," and the like, in the color filter 32 in the button part 30b, the buttons 101b to 101d can be recognized more easily, thereby being able to improve the operability of the smartphone 100.

In the display device with a touch detection function 1, by coloring the color filter 32 in the button part 30b in red (R), green (G), blue (B), or the like, so as to have a shape such as characters, graphics, symbols, or icons representing the "back button," the "home button," the "menu button," and the like, the buttons 101b to 101d can be recognized more easily, thereby being able to improve the operability of the smartphone 100.

In the display device with a touch detection function 1, if each button has a different color, the buttons 101b to 101d can be recognized more easily, thereby being able to improve the operability of the smartphone 100.

Even in a case where 2D touch input detection and image display are not performed, e.g., in a case where the smartphone 100 is in a sleep mode, or the like, the display device with a touch detection function 1 can perform 0D button touch input detection by selecting and driving the drive electrode COMa in the button part 30b. Thus, in the display device with a touch detection function 1, 0D button touch input can be used as a trigger for bringing the smartphone 100 from a sleep mode to a normal operation mode, for example, and the operability of the smartphone 100 can be thereby improved while suppressing the power consumption.

The display device with a touch detection function 1 has been described with an example in which the present embodiment is applied to TN mode, VA mode, ECB mode, or the like. However, the present embodiment can be applied also to FFS mode, IPS mode, or the like.

1-5. Fifth Embodiment

In the fourth embodiment, the 0D buttons are irradiated with the backlight from the back surfaces of the 0D buttons. Furthermore, a TFT element and an electrode may be disposed in the button part and thereby the luminance of the 0D buttons may be changed by changing a light amount passing through the button part.

Figure 21:
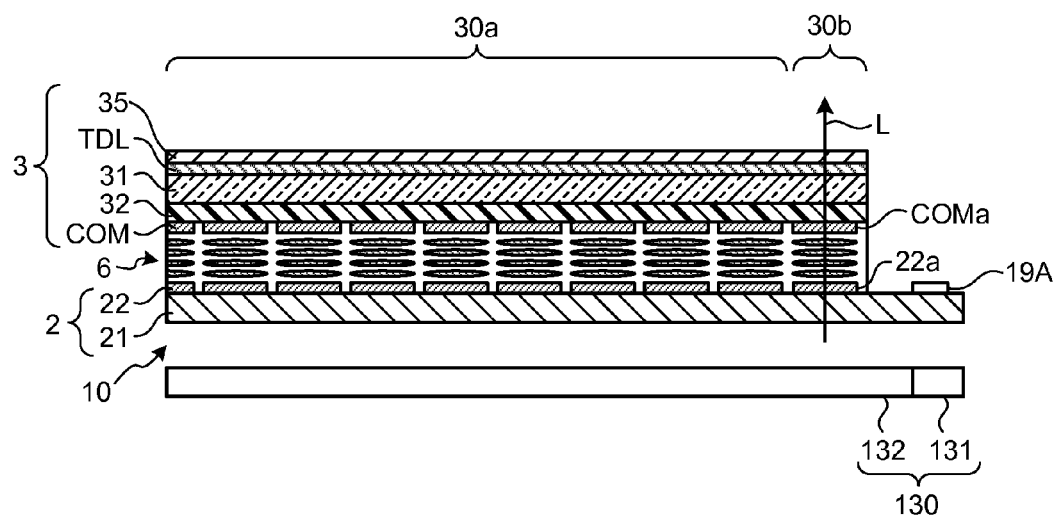
FIG. 21 is a cross-sectional view representing a schematic cross-sectional structure of a display unit with a touch detection function according to a fifth embodiment.

FIG. 21 is a cross-sectional view representing a schematic cross-sectional structure of a display unit with a touch detection function according to the fifth embodiment. In the portion of the pixel substrate 2 and the counter substrate 3 corresponding to the button part 30b, a TFT element Tr (not illustrated) is formed and a pixel electrode 22a is formed. The TFT element Tr and the pixel electrode 22a in the button part 30b are driven by the gate driver 12 (see FIG. 2) and the source driver 13 (see FIG. 2).

The control unit 11 (see FIG. 2) changes an electric field between the pixel electrode 22a and the drive electrode COMa through the gate driver 12 and the source driver 13. The liquid crystal layer 6 in the button part 30b modulates light L passing therethrough in accordance with a state of the electric field between the pixel electrode 22a and the drive electrode COMa.

Thus, the display device with a touch detection function 1 can change the luminance of the buttons 101b to 101d. Therefore, the display device with a touch detection function 1 can increase the luminance of the buttons 101b to 101d for bright outdoors or the like and can decrease the luminance of the buttons 101b to 101d for dark indoors or the like, for example. The display device with a touch detection function 1 can thus improve the visibility of the buttons 101b to 101d, thereby being able to improve the operability of the smartphone 100.

Even in a case where 2D touch input detection and image display are not performed, e.g., in a case where the smartphone 100 is in a sleep mode, or the like, the display device with a touch detection function 1 can perform 0D button touch input detection by selecting and driving the drive electrode COMa in the button part 30b. Thus, in the display device with a touch detection function 1, 0D button touch input can be used as a trigger for bringing the smartphone 100 from a sleep mode to a normal operation mode, for example, and the operability of the smartphone 100 can be thereby improved while suppressing the power consumption.

In the display unit with a touch detection function 10 illustrated in FIG. 21, the common light source 131 is used to irradiate the touch part 30a for detecting 2D touch input and the button part 30b for detecting 0D button touch input. However, a light source for irradiating the touch part 30a and a light source for irradiating the button part 30b may be provided separately.

Figure 22:
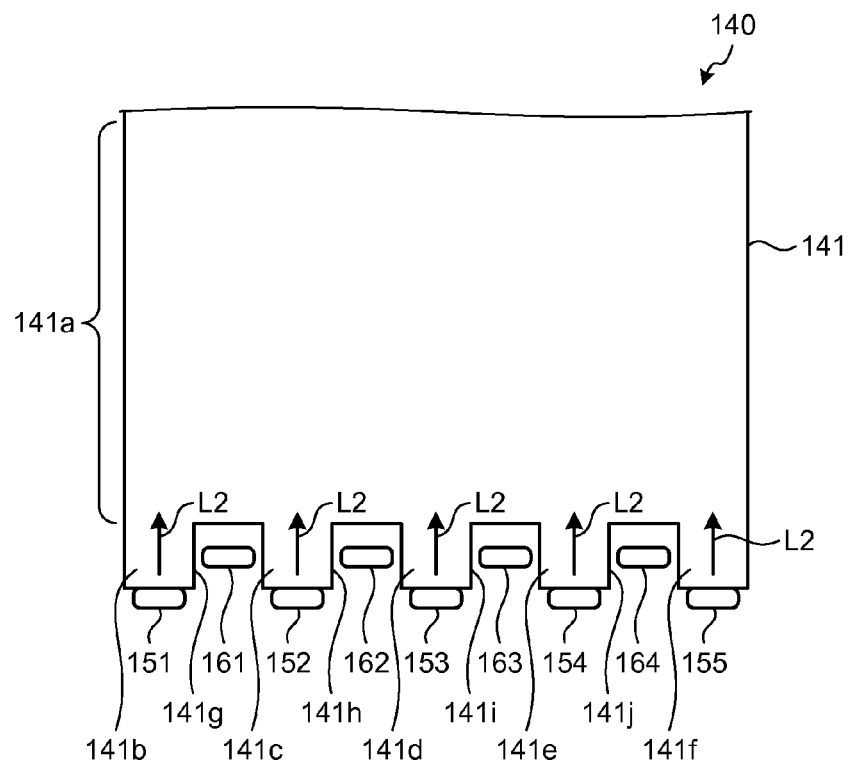
FIG. 22 is a plan view illustrating another example of a backlight in the display device with a touch detection function according to the fifth embodiment.

FIG. 22 is a plan view illustrating another example of the backlight in the display device with a touch detection function according to the fifth embodiment. A backlight 140 includes a light guide plate 141 and light sources 151 to 155 and 161 to 164. The light guide plate 141 includes: a main body portion 141a; and projections 141b to 141f projecting in a first direction (the downward direction in the figure) parallel to the principal surface of the main body portion 141a from one side (the side located on the lower side in the figure) of the main body portion 141a.

The light sources 151 to 155 for irradiating the touch and display area 101a are disposed such that the light-emitting surfaces thereof face surfaces of the projections 141b to 141f on the first direction side intersecting with the principal surface of the main body portion 141a and are directed to a second direction (the upward direction in the figure) opposite to the first direction. Light beams L2 emitted from the light sources 151 to 155 are incident on the projections 141b to 141f, travel through the projections 141b to 141f in the second direction, and reach the main body portion 141a. In other words, each of the projections 141b to 141f functions as a light-incident portion for the light beams L2. The light beams L2 reached to the main body portion 141a are diffused through the entire main body portion 141a and the traveling direction of the light beams is changed to a direction perpendicular to the principal surface of the main body portion 141a (the nearer-side direction of the paper plane).

Recesses 141g to 141j are formed between the projections 141b to 141f. The light sources 161 to 164 for irradiating the buttons 101b to 101d are disposed such that the light-emitting surfaces thereof face a direction toward the buttons 101b to 101d (the nearer-side direction of the paper plane) and are surrounded by the recesses 141g to 141j. Light beams emitted from the light sources 161 to 164 pass through the pixel substrate 2, the liquid crystal layer 6, and the counter substrate 3 in the button part 30b to irradiate the buttons 101b to 101d.

In the backlight 140, the light sources 151 to 155 for irradiating the touch and display area 101a and the light sources 161 to 164 for irradiating the buttons 101*b* to 101*d* are separately provided. As a result, even in a case where 2D touch input detection and image display are not performed, e.g., in a case where the smartphone 100 is in a sleep mode, or the like, the 0D buttons 101*b* to 101*d* can be irradiated. Thus, the display device with a touch detection function 1 can illuminate the buttons 101*b* to 101*d* even when the smartphone 100 is in a sleep mode, thereby being able to improve the operability of the smartphone 100.

In the backlight 140, the light sources 151 to 155 for irradiating the touch and display area 101*a* and the light sources 161 to 164 for irradiating the buttons 101*b* to 101*d* are separately provided. As a result, the luminance of the touch and display area 101*a* and the luminance of the buttons 101*b* to 101*d* can be made different from each other. Thus, by decreasing the luminance of the touch and display area 101*a* and increasing the luminance of the buttons 101*b* to 101*d*, for example, the display device with a touch detection function 1 can reduce the power consumption thereof while increasing the visibility of the buttons 101*b* to 101*d*.

The light beams L2 emitted from the light sources 151 to 155 do not diffuse much when they enter the projections 141*b* to 141*f*, but diffuse widely when they enter the main body portion 141*a*. Thus, even when the recesses 141*g* to 141*j* are provided, they do not have a great effect on the diffusion of the lights L2. In other words, the recesses 141*g* to 141*j* are dead spaces in the backlight 140. Thus, providing the light sources 161 to 164 within the recesses 141*g* to 141*j*, which are dead spaces, makes it possible to reduce the occupied area of the backlight 140, thereby being able to prevent the housing of the smartphone 100 from increasing in size.

The display device with a touch detection function 1 has been described with an example in which the present embodiment is applied to TN mode, VA mode, ECB mode, or the like. However, the present embodiment can be applied also to FFS mode, IPS mode, or the like.

1-6. Sixth Embodiment

In the first to fifth embodiments, the button part is disposed in a portion where the pixel substrate and the counter substrate overlap each other in a planar view (as viewed from the direction perpendicular to the principal surface of the display device with a touch detection function). However, a portion not overlapping the pixel substrate in a planar view may be provided in the counter substrate and the button part may be provided in that portion.

Figure 23:
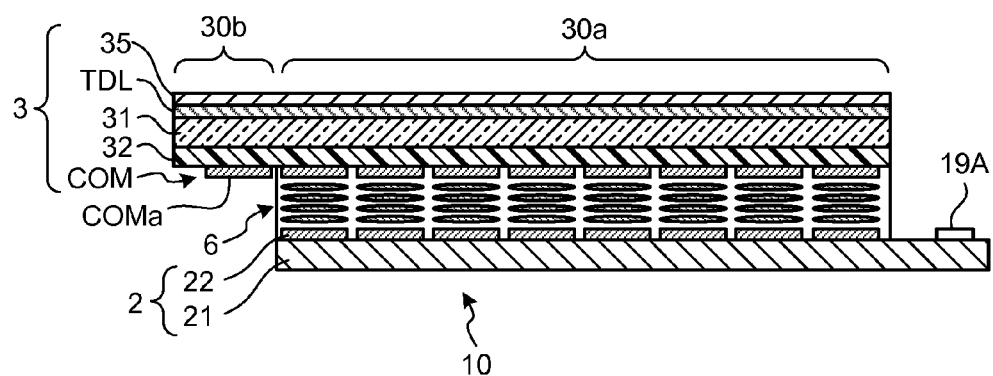
FIG. 23 is a cross-sectional view representing a schematic cross-sectional structure of a display unit with a touch detection function according to a sixth embodiment.

FIG. 23 is a cross-sectional view representing a schematic cross-sectional structure of a display unit with a touch detection function according to the sixth embodiment. The display unit with a touch detection function 10 includes: the pixel substrate 2; the counter substrate 3 disposed in a facing manner in a direction perpendicular to the surface of the pixel substrate 2; and the liquid crystal layer 6 interposed between the pixel substrate 2 and the counter substrate 3.

A portion of the counter substrate 3 overlaps the pixel substrate 2 and the other portion thereof does not overlap the pixel substrate 2 in a planar view (as viewed from the direction perpendicular to the surface of the pixel substrate 2). In the counter substrate 3, the portion overlapping the pixel substrate 2 serves as the touch part 30*a* and the portion not overlapping the pixel substrate 2 serves as the button part 30*b*.

In the portion of the counter substrate 3 corresponding to the button part 30*b*, only detection for 0D button touch input is performed and no image display is performed. Thus, as illustrated in FIG. 23, the drive electrode COMa and the touch detection lines TDL used for detecting 0D button touch input are formed therein.

Figure 24:
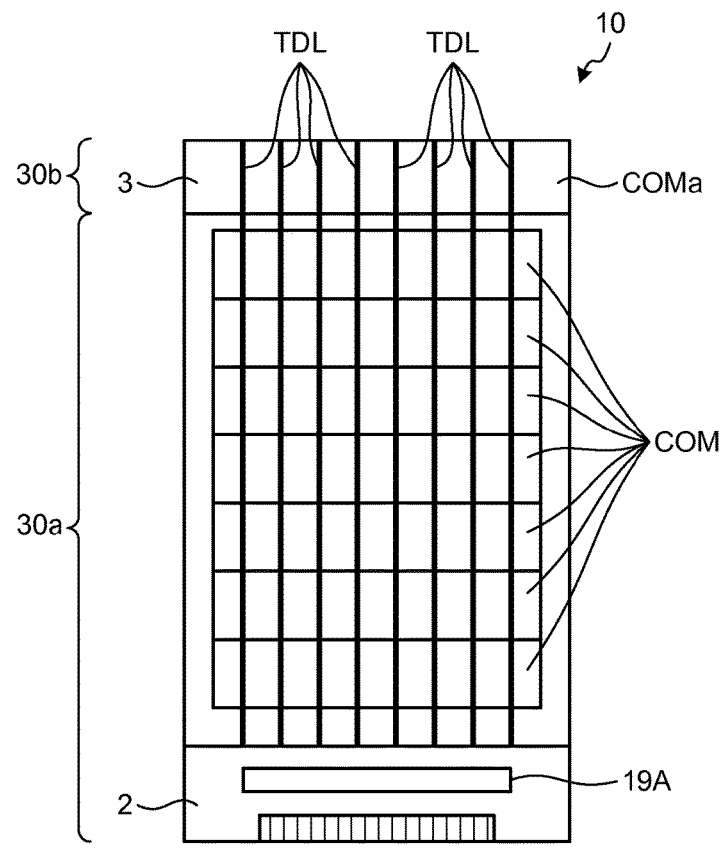
FIG. 24 is a plan view of the display unit with a touch detection function in FIG. 23.

FIG. 24 is a plan view of the display unit with a touch detection function in FIG. 23. As illustrated in FIG. 24, a portion (the portion on the lower side in the figure) of the counter substrate 3 overlaps the pixel substrate 2 and the other portion (the portion on the upper side in the figure) does not overlap the pixel substrate 2. In the counter substrate 3, the portion overlapping the pixel substrate 2 serves as the touch part 30*a* and the portion not overlapping the pixel substrate 2 serves as the button part 30*b*.

The button part 30*b* extends in a direction along a short side of the display unit with a touch detection function 10. The drive electrode COMa formed in the button part 30*b* for detecting 0D button touch input also extends in a direction along a short side of the display unit with a touch detection function 10. The touch detection lines TDL for performing 2D touch input detection and 0D button touch input detection extend over the touch part 30*a* and the button part 30*b* in a direction along a long side of the display unit with a touch detection function 10.

According to the present embodiment, the area of the liquid crystal layer 6 can be limited to the area of the touch part 30*a*. Thus, the display device with a touch detection function 1 can suppress the amount of the liquid crystal used, thereby achieving a cost reduction and contributing to environmental conservation. It is therefore economically favorable.

The drive electrode COMa for detecting 0D button touch input can be formed in the same layer and in the same step as the drive electrodes COM for performing 2D touch input detection and image display. The display device with a touch detection function 1 can thus suppress an increase in the manufacturing steps, thereby being able to suppress an increase in the cost. The drive electrodes COM in the touch part 30*a* and the drive electrode COMa in the button part 30*b* can be operated by sequentially applying a drive signal thereto by the same drive circuit (drive electrode driver 14). The display device with a touch detection function 1 can thus suppress an increase in circuits, thereby being able to suppress an increase in the cost. The display device with a touch detection function 1 can perform touch detection by employing the detection principle of the mutual capacitance method both in the touch part 30*a* and in the button part 30*b*.

Even in a case where 2D touch input detection and image display are not performed, e.g., in a case where the smartphone 100 is in a sleep mode, or the like, the display device with a touch detection function 1 can perform 0D button touch input detection by selecting and driving the drive electrode COMa in the button part 30*b*. Thus, in the display device with a touch detection function 1, 0D button touch input can be used as a trigger for bringing the smartphone 100 from a sleep mode to a normal operation mode, for example, and the operability of the smartphone 100 can be thereby improved while suppressing the power consumption.

Next, a method for manufacturing the display unit with a touch detection function 10 according to the present embodiment will be described. First, a method for manufacturing the display unit with a touch detection function 10 according to the first to fifth embodiments, i.e., the display unit with a touch detection function 10 in which the entire counter substrate 3 overlaps the pixel substrate 2 will be described as a comparative example.

Figure 25:
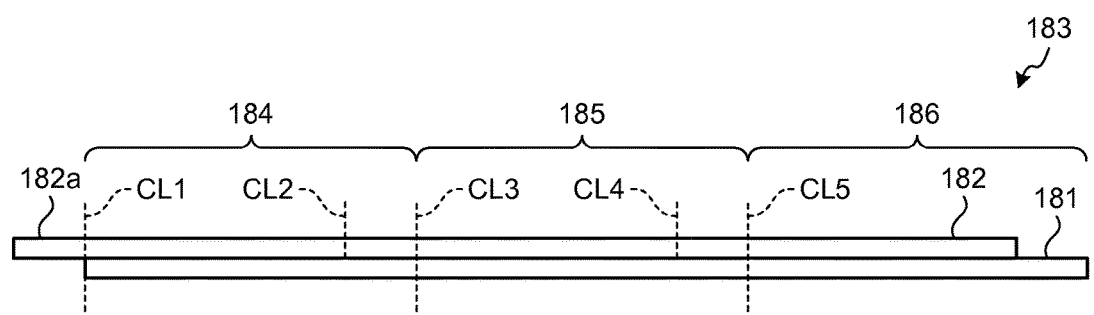
FIG. 25 is a diagram for explaining a method for manufacturing the display unit with a touch detection function according to any one of the first to fifth embodiments.
Figure 26:
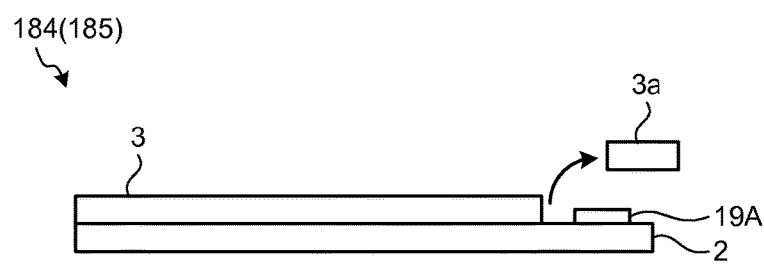
FIG. 26 is a diagram for explaining the method for manufacturing the display unit with a touch detection function according to any one of the first to fifth embodiments.

FIGS. 25 and 26 are diagrams for explaining the method for manufacturing the display unit with a touch detection function according to the first to fifth embodiments. First, TFT elements Tr, scanning signal lines GCL, pixel signal lines SGL, pixel electrodes 22, and the like are formed on the principal surface of a large substrate (mother glass) 181 to be the pixel substrates 2 after being cut in the future. On the other hand, a color filter 32, drive electrodes COM, and the like are formed on the principal surface (the surface on the large substrate 181 side) of a large substrate (mother glass) 182 to be the counter substrates 3 after being cut in the future. Next, the large substrate 181 and the large substrate 182 are adhered to each other via a sealing member to produce a large adhered substrate 183. At this time, the liquid crystal is entered between the large substrate 181 and the large substrate 182 with a liquid crystal injection method, a liquid crystal dropping method, or the like.

Next, the large substrate 182 is cut along a cut line CL1 to remove an unnecessary end portion 182a. The large substrate 181 and the large substrate 182 are cut along cut lines CL3 and CL5. As a result of this cutting, three adhered substrates 184 to 186 are obtained. In the adhered substrate 184, the counter substrate 3 is cut along a cut line CL2 to remove an unnecessary portion 3a and thereby reserve an area where a COG 19A is mounted on the pixel substrate 2. The COG 19A is mounted on the pixel substrate 2 to produce the display unit with a touch detection function 10. Similarly, in the adhered substrate 185, the counter substrate 3 is cut along a cut line CL4 to remove the unnecessary portion 3a and thereby reserve an area where the COG 19A is mounted on the pixel substrate 2. The COG 19A is mounted on the pixel substrate 2 to produce the display unit with a touch detection function 10. The adhered substrate 186 does not have to remove an unnecessary portion. The COG 19A is mounted on the pixel substrate 2 to produce the display unit with a touch detection function 10.

Next, the method for manufacturing the display unit with a touch detection function 10 according to the present embodiment will be described. In other words, the method for manufacturing the display unit with a touch detection function 10 in which a portion of the counter substrate 3 overlaps the pixel substrate 2 and the other portion thereof does not overlap the pixel substrate 2 will be described.

Figure 27:
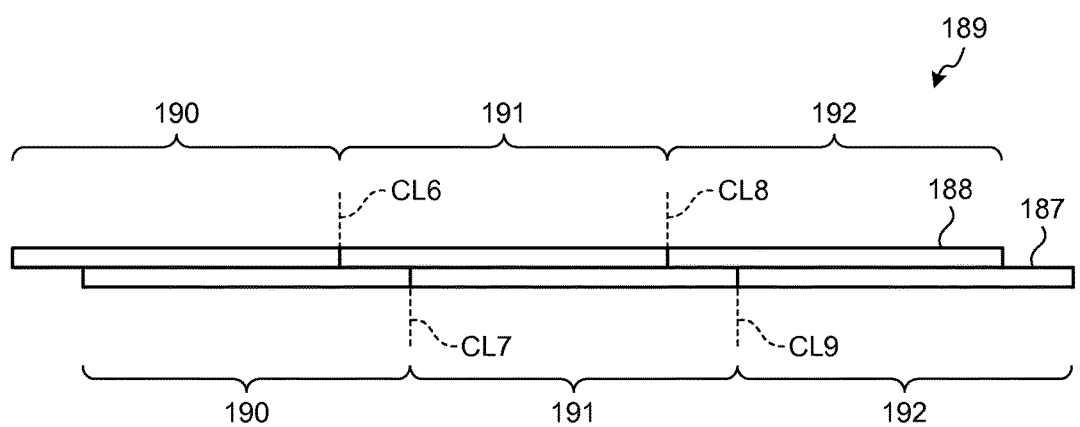
FIG. 27 is a diagram for explaining a method for manufacturing the display unit with a touch detection function according to the sixth embodiment.
Figure 28:
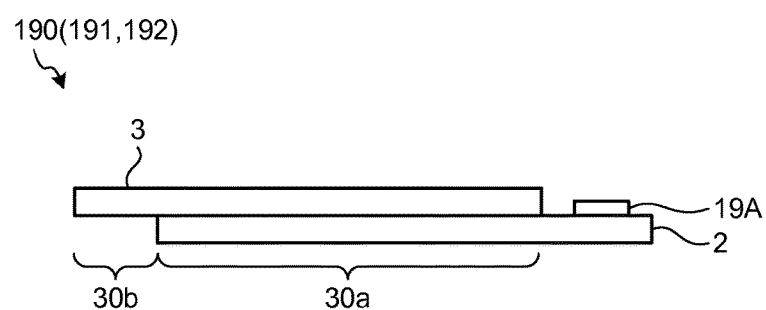
FIG. 28 is a diagram for explaining the method for manufacturing the display unit with a touch detection function according to the sixth embodiment.

FIGS. 27 and 28 are diagrams for explaining the method for manufacturing the display unit with a touch detection function according to the present embodiment. First, TFT elements Tr, scanning signal lines GCL, pixel signal lines SGL, pixel electrodes 22, and the like are formed on the principal surface of a large substrate 187 to be the pixel substrates 2 after being cut in the future. On the other hand, a color filter 32, drive electrodes COM, and the like are formed on the principal surface (the surface on the large substrate 187 side) of a large substrate 188 to be the counter substrates 3 after being cut in the future. Next, the large substrate 187 and the large substrate 188 are adhered to each other via a sealing member to produce a large adhered substrate 189. At this time, the liquid crystal is entered between the large substrate 187 and the large substrate 188 with a liquid crystal injection method, a liquid crystal dropping method, or the like.

Next, the large substrate 188 is cut along cut lines CL6 and CL8, and the large substrate 187 is cut along cut lines CL7 and CL9. As a result of this cutting, three adhered substrates 190 to 192 are obtained. In the adhered substrates 190 to 192, there is no need to remove an unnecessary portion. A COG 19A is mounted on the pixel substrate 2 to produce the display unit with a touch detection function 10. A portion of the counter substrate 3 in the adhered substrate 191 not overlapping the pixel substrate 2 in the adhered substrate 191, i.e., a portion of the counter substrate 3 in the adhered substrate 191 projecting in the left direction in the figure, overlaps a portion of the pixel substrate 2 in the adjacent adhered substrate 190 not overlapping the counter substrate 3 in the adhered substrate 190, i.e., a portion of the pixel substrate 2 in the adhered substrate 190 projecting in the right direction in the figure. Similarly, a portion of the counter substrate 3 in the adhered substrate 192 not overlapping the pixel substrate 2 in the adhered substrate 192, i.e., a portion of the counter substrate 3 in the adhered substrate 192 projecting in the left direction in the figure, overlaps a portion of the pixel substrate 2 in the adjacent adhered substrate 191 not overlapping the counter substrate 3 in the adhered substrate 191, i.e., a portion of the pixel substrate 2 in the adhered substrate 191 projecting in the right direction in the figure.

According to the present embodiment, without generating unnecessary portions, the adhered substrates 190 to 192 can be produced and the display units with a touch detection function 10 can be further produced. Thus, the manufacturing steps can be reduced and waste discharged can be suppressed. It can contribute to environmental conservation and is economically favorable.

In FIGS. 27 and 28, the three display units with a touch detection function 10 are produced from the one large adhered substrate 189. In reality, however, a large number of display units with a touch detection function 10 can be produced from one adhered substrate.

In FIG. 23, the display device with a touch detection function 1 has been illustrated with an example in which the embodiment is applied to TN mode, VA mode, ECB mode, or the like. However, the present embodiment can be applied also to FFS mode, IPS mode, or the like. The drive electrodes COM are provided on the counter substrate 3 side in TN mode, VA mode, ECB mode, or the like, whereas the drive electrodes COM are provided on the pixel substrate 2 side in FFS mode, IPS mode, or the like.

Figure 29:
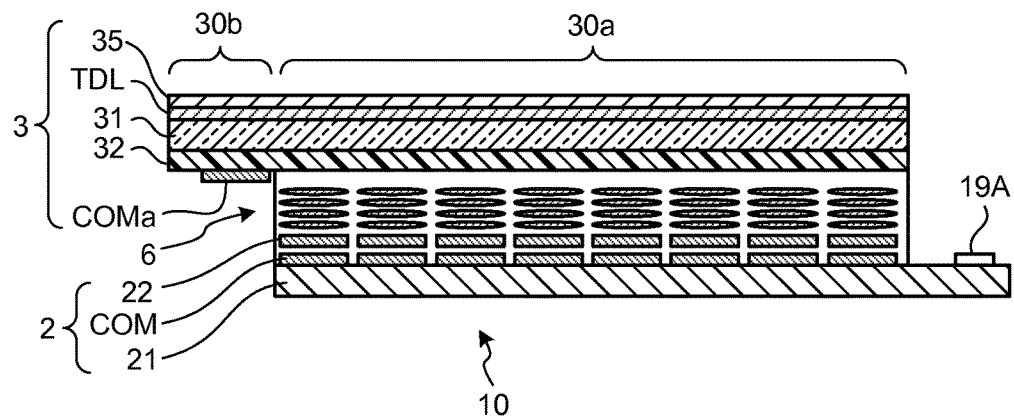
FIG. 29 is a cross-sectional view representing a schematic cross-sectional structure of a display unit with a touch detection function according to a modification of the sixth embodiment.

FIG. 29 is a cross-sectional view representing a schematic cross-sectional structure of a display unit with a touch detection function having an FFS structure according to a modification of the sixth embodiment. The display unit with a touch detection function 10 includes: the pixel substrate 2; the counter substrate 3 disposed in a facing manner in a direction perpendicular to the surface of the pixel substrate 2; and the liquid crystal layer 6 interposed between the pixel substrate 2 and the counter substrate 3.

A portion of the counter substrate 3 overlaps the pixel substrate 2 and the other portion thereof does not overlap the pixel substrate 2 in a planar view (as viewed from the direction perpendicular to the surface of the pixel substrate 2). In the counter substrate 3, the portion overlapping the pixel substrate 2 serves as the touch part 30a and the portion not overlapping the pixel substrate 2 serves as the button part 30b.

As illustrated in FIG. 29, in FFS mode, the drive electrodes COM are provided on the pixel substrate 2 side in the touch part 30a for performing 2D touch input detection and image display and the pixel electrodes are layered above the drive electrodes via an insulating layer (not illustrated) provided therebetween. In the touch part 30a, the liquid crystal layer 6 is oriented by an electric field between the pixel electrodes 22 and the drive electrodes COM on the pixel substrate 2 side and an image is thereby displayed. In the touch part 30a, 2D touch input detection is performed by an electric field between the drive electrodes COM on the pixel substrate 2 side and the touch detection lines TDL on the counter substrate 3 side.

In the button part 30b, on the other hand, the drive electrode COMa is provided on the counter substrate 3 side. In the button part 30b, 0D button touch input detection is performed by an electric field between the drive electrode COMa and the touch detection line TDL on the counter substrate 3 side.

Even in this case, detection in the touch part and the button part is performed by driving the drive electrode COMa and the drive electrodes COM in synchronization with each other by the drive electrode driver. This can eliminate components and manufacturing steps, thereby being able to suppress an increase in the cost and downsize the device.

Although the FFS structure has been described above, it can be applied also to an IPS structure in which the pixel electrodes and the drive electrodes are disposed above the pixel substrate 2 in an alternate manner on the same plane.

According to the present modification, 0D button touch input detection can be performed in the button part 30b while receiving benefits such as a wide viewing angle in FFS mode, IPS mode, or the like.

Even in a case where 2D touch input detection and image display are not performed, e.g., in a case where the smartphone 100 is in a sleep mode, or the like, the display device with a touch detection function 1 can perform 0D button touch input detection by selecting and driving the drive electrode COMa in the button part 30b. Thus, in the display device with a touch detection function 1, 0D button touch input can be used as a trigger for bringing the smartphone 100 from a sleep mode to a normal operation mode, for example, and the operability of the smartphone 100 can be thereby improved while suppressing the power consumption.

1-7. Seventh Embodiment

In the first to sixth embodiments, the drive electrode for 0D button touch input detection is formed on the principal surface of the counter substrate, i.e., on the surface of the counter substrate on the pixel substrate side. However, the drive electrode for 0D button touch input detection may be formed on the surface of the counter substrate opposite to the pixel substrate.

Figure 30:
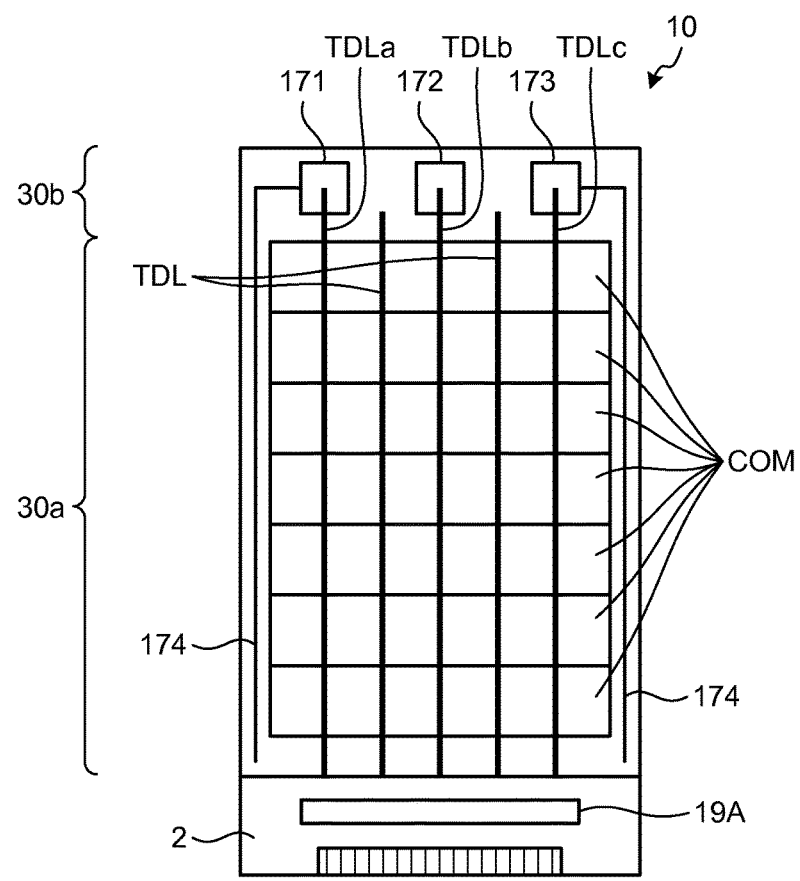
FIG. 30 is a plan view of a display unit with a touch detection function according to a seventh embodiment.

FIG. 30 is a plan view of a display unit with a touch detection function according to the seventh embodiment. As illustrated in FIG. 30, in the display unit with a touch detection function 10, the touch detection lines TDLa to TDLc for performing 2D touch input detection and 0D button touch input detection extend so as to cover from the touch part 30a to the button part 30b. In the button part 30b, drive electrodes 171 to 173 for 0D button touch input detection are formed so as to surround end portions of the touch detection lines TDLa to TDLc, respectively. A wiring 174 for driving the drive electrodes 171 to 173 is formed so as to go through the frame of the display unit with a touch detection function 10.

Figure 31:
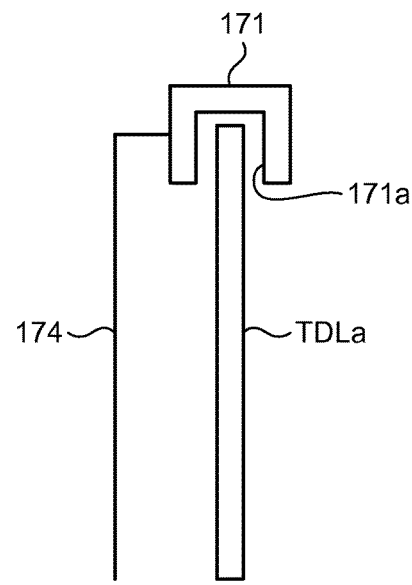
FIG. 31 is an enlarged plan view of a touch detection line and a drive electrode in FIG. 30.

FIG. 31 is an enlarged plan view of the touch detection line and the drive electrode in FIG. 30. The drive electrodes 171 to 173 are formed in the same layer as the touch detection lines TDLa to TDLc and the drive electrodes 171 to 173 are formed in the same step as the touch detection lines TDLa to TDLc. As illustrated in FIG. 31, the drive electrode 171 has a recess, i.e., an opening 171a, and an end portion of the touch detection line TDLa extends to the inside of the opening 171a. An electric field is formed in a region between the end portion of the touch detection line TDLa and the drive electrode 171 surrounding the end portion thereof. Due to this electric field, 0D button touch input can be detected.

According to the present embodiment, an electric field is formed in the region between the end portion of the touch detection line TDLa and the drive electrode 171 surrounding that end portion. Thus, the display device with a touch detection function 1 can expand the detection range of 0D button touch input, improve the detection sensitivity, and improve the operability of the smartphone 100.

The drive electrodes 171 to 173 are formed in the same layer as the touch detection lines TDLa to TDLc and the drive electrodes 171 to 173 are formed in the same step as the touch detection lines TDLa to TDLc. Thus, the display unit with a touch detection function 10 can suppress an increase in the manufacturing steps, thereby being able to achieve a cost reduction.

Even in a case where 2D touch input detection and image display are not performed, e.g., in a case where the smartphone 100 is in a sleep mode, or the like, the display device with a touch detection function 1 can perform 0D button touch input detection by selecting and driving the drive electrode COMa in the button part 30b. Thus, in the display device with a touch detection function 1, 0D button touch input can be used as a trigger for bringing the smartphone 100 from a sleep mode to a normal operation mode, for example, and the operability of the smartphone 100 can be thereby improved while suppressing the power consumption.

The display device with a touch detection function 1 according to the present embodiment can be applied to TN mode, VA mode, ECB mode, FFS mode, IPS mode, or the like.

1-8. Eighth Embodiment

In the first to seventh embodiments, a line width of the touch detection line is formed uniformly. However, a line width of the portion of the touch detection line for detecting 0D button touch input may be formed larger than a line width of the portion thereof for detecting 2D touch input.

Figure 32:
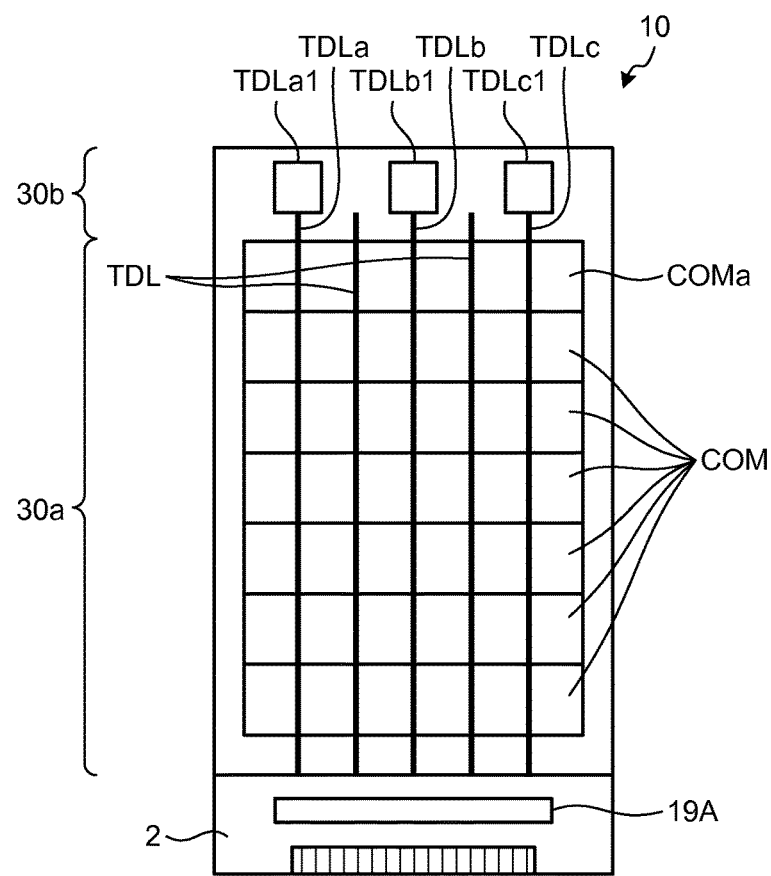
FIG. 32 is a plan view of a display unit with a touch detection function according to an eighth embodiment.

FIG. 32 is a plan view of a display unit with a touch detection function according to the eighth embodiment. As illustrated in FIG. 32, in the display unit with a touch detection function 10, the touch detection lines TDLa to TDLc for performing 2D touch input detection and 0D button touch input detection extend so as to cover from the touch part 30a to the button part 30b. In the button part 30b, a line width of end portions TDLa1 to TDLc1 of the touch detection lines TDLa to TDLc is formed larger than a line width of the touch detection lines TDLa to TDLc in the touch part 30a.

Figure 33:
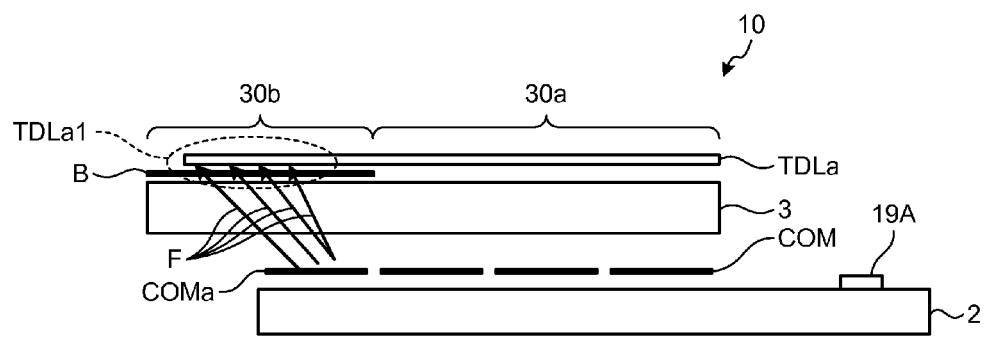
FIG. 33 is a cross-sectional view of the display unit with a touch detection function in FIG. 32.

FIG. 33 is a cross-sectional view of the display unit with a touch detection function in FIG. 32. In the button part 30b, a light-shielding layer B is formed on a surface of the counter substrate 3 opposite to the principal surface thereof (the surface on the upper side in the figure). The touch detection line TDLa is formed in an upper layer of the light-shielding layer B. On the principal surface side of the counter substrate 3, the drive electrode COMa for 0D button touch input detection is formed. An electric field F directed from the drive electrode COMa to the end portion TDLa1 in a direction from the lower right to the upper left in the figure is formed between the drive electrode COMa and the end portion TDLa1 of the touch detection line TDLa. The display unit with a touch detection function 10 can detect 0D button touch input due to such an electric field F.

According to the present embodiment, the line width of the end portions TDLa1 to TDLc1 of the touch detection lines TDLa to TDLc in the button part 30b is formed larger than the line width of the touch detection lines TDLa to TDLc in the touch part 30a. Thus, the display device with a touch detection function 1 can expand the detection range of 0D button touch input, improve the detection sensitivity, and improve the operability of the smartphone 100.

Even in a case where 2D touch input detection and image display are not performed, e.g., in a case where the smartphone 100 is in a sleep mode, or the like, the display device with a touch detection function 1 can perform 0D button touch input detection by selecting and driving the drive electrode COMa in the button part 30*b*. Thus, in the display device with a touch detection function 1, 0D button touch input can be used as a trigger for bringing the smartphone 100 from a sleep mode to a normal operation mode, for example, and the operability of the smartphone 100 can be thereby improved while suppressing the power consumption.

The display device with a touch detection function 1 according to the present embodiment can be applied to TN mode, VA mode, ECB mode, FFS mode, IPS mode, or the like.

1-9. Ninth Embodiment

In the first to eighth embodiments, the drive electrode in the touch part and the drive electrode in the button part are driven in parallel or in a time-divisional manner. However, only the drive electrode in the button part may be driven without driving the drive electrode in the touch part.

Figure 34:
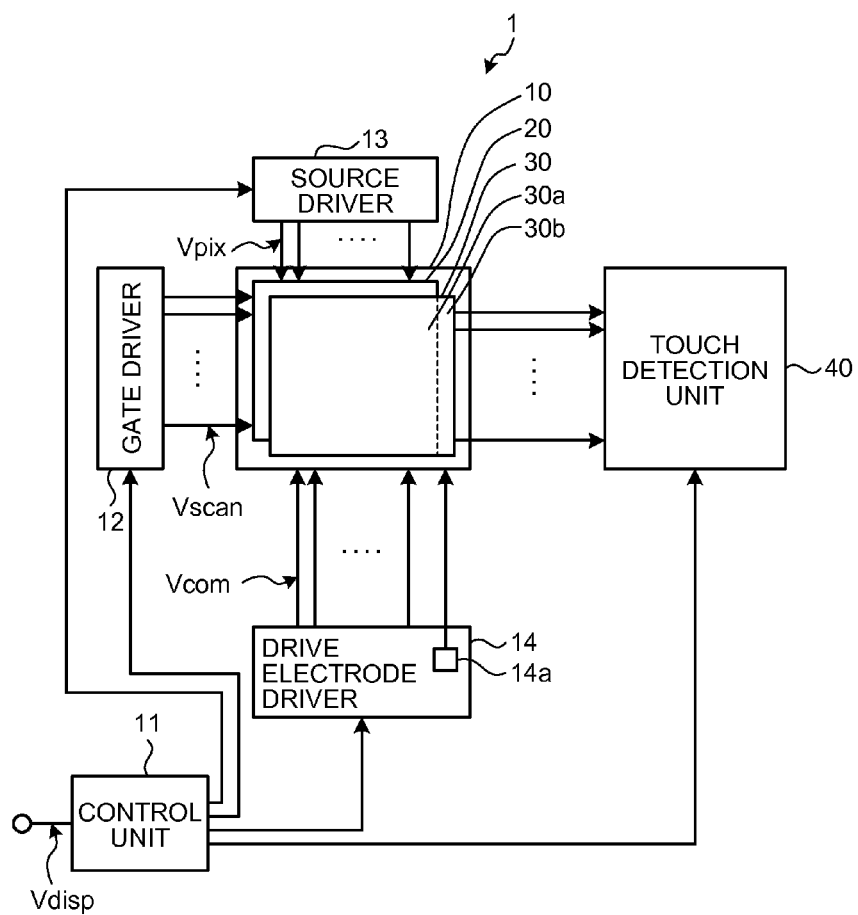
FIG. 34 is a block diagram representing a configuration example of a display device with a touch detection function according to a ninth embodiment.

FIG. 34 is a block diagram representing a configuration example of a display device with a touch detection function according to the ninth embodiment. The display device with a touch detection function 1 includes: the display unit with a touch detection function 10; the control unit 11; the gate driver 12; the source driver 13; the drive electrode driver 14; and the touch detection unit 40.

The drive electrode driver 14 is a circuit for supplying the drive signal Vcom to the drive electrode COM in the display unit with a touch detection function 10 based on the control signal supplied by the control unit 11. The drive electrode driver 14 includes a button driving unit 14*a* for driving the drive electrode COMa for 0D button touch input detection in the button part 30*b*. The button driving unit 14*a* can operate independently to supply the drive signal Vcom to the drive electrode COMa in the button part 30*b* even when the portion other than the button driving unit 14*a* in the drive electrode driver 14 is not operated, i.e., even when image display and 2D touch input detection are not performed.

According to the present embodiment, even in a case where 2D touch input detection and image display are not performed, e.g., in a case where the smartphone 100 is in a sleep mode, or the like, 0D button touch input detection can be performed. Thus, in the display device with a touch detection function 1, 0D button touch input can be used as a trigger for bringing the smartphone 100 from a sleep mode to a normal operation mode, and the operability of the smartphone 100 can be thereby improved while suppressing the power consumption.

Figure 35:
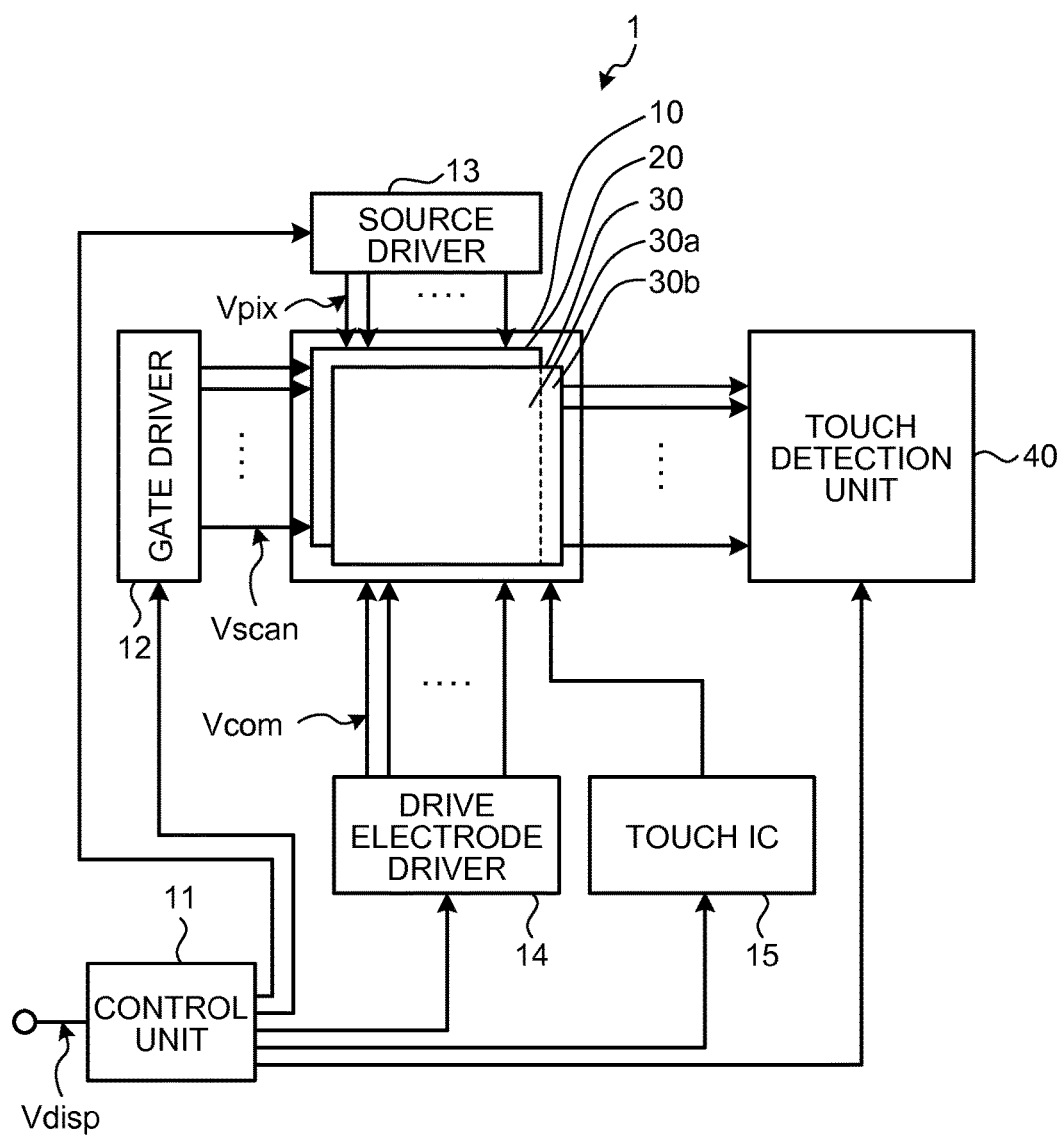
FIG. 35 is a block diagram representing a configuration example of a display device with a touch detection function according to a modification of the ninth embodiment.

FIG. 35 is a block diagram representing a configuration example of a display device with a touch detection function according to a modification of the ninth embodiment. The display device with a touch detection function 1 includes: the display unit with a touch detection function 10; the control unit 11; the gate driver 12; the source driver 13; the drive electrode driver 14; a touch IC 15; and the touch detection unit 40.

The touch IC 15 is a circuit for supplying the drive signal Vcom to the drive electrode COMa for 0D button touch input detection in the button part 30*b* of the display unit with a touch detection function 10 based on the control signal supplied by the control unit 11. The touch IC 15 can supply the drive signal Vcom to the drive electrode COMa in the button part 30*b* even when the drive electrode driver 14 is not operated, i.e., even when image display and 2D touch input detection are not performed.

According to the present modification, even in a case where 2D touch input detection and image display are not performed, e.g., in a case where the smartphone 100 is in a sleep mode, or the like, 0D button touch input detection can be performed. Thus, in the display device with a touch detection function 1, 0D button touch input can be used as a trigger for bringing the smartphone 100 from a sleep mode to a normal operation mode, and the operability of the smartphone 100 can be thereby improved while suppressing the power consumption.

Although the present disclosure has been described above with reference to some embodiments and modifications, the present disclosure is not limited to these embodiments and the like and various modifications are possible.

In the above-described embodiments, the drive electrodes COM are driven and scanned one by one as illustrated in the first embodiment described above. However, the present disclosure is not limited thereto. Alternatively, the predetermined number of drive electrodes COM may be driven and the drive electrodes COM may be scanned by being shifted one by one, for example.

In the display device with a touch detection function 1 according to each of the above-described embodiments and modifications, the liquid crystal display unit 20 using the liquid crystal in various modes such as TN mode, VA mode, or ECB mode and the touch detection device 30 can be integrated together to obtain the display unit with a touch detection function 10. Alternatively, the display unit with a touch detection function 10 may be obtained by integrating the liquid crystal display unit using the liquid crystal in a transverse electric field mode such as FFS mode or IPS mode and the touch detection device together.

For example, the display device with a touch detection function 1 may employ the liquid crystal in a transverse electric field mode. Although a so-called in-cell type in which a liquid crystal display unit and a capacitive type touch detection device are integrated together is employed in each of the above-described embodiments, the present disclosure is not limited thereto. Alternatively, a device in which a capacitive type touch detection device is mounted on a liquid crystal display unit may be employed, for example. Also in this case, by employing the configuration as described above, touch detection can be performed while suppressing effects of external noise and noise transmitted from the liquid crystal display unit (that corresponding to the internal noise in each of the above-described embodiments).

2. Application Examples

Next, application examples of the display device with a touch detection function 1 described in each of the embodiments and the modifications will be described with reference to FIGS. 36 to 47. FIGS. 36 to 47 are diagrams each illustrating an example of an electronic apparatus to which the display device with a touch detection function according to any one of the embodiments of the present disclosure is applied. The display devices with a touch detection function 1 according to the first to ninth embodiments and the modifications can be applied to electronic apparatuses in any fields such as TV apparatuses, digital cameras, notebook personal computers, portable electronic apparatuses such as mobile phones, or video cameras. In other words, the display devices with a touch detection function 1 according to the first to ninth embodiments and the modifications can be applied to electronic apparatuses in any fields for displaying externally-inputted video signals or internally-generated video signals as images or videos.

(Application Example 1)

Figure 36:
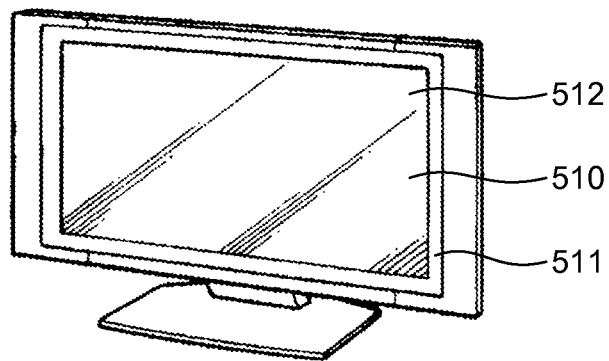
FIG. 36 is a diagram illustrating an example of an electronic apparatus to which the display device with a touch detection function according to any one of the embodiments is applied.

An electronic apparatus illustrated in FIG. 36 is a TV apparatus to which the display device with a touch detection function 1 according to any one of the first to ninth embodiments and the modifications is applied. This TV apparatus includes a video display screen unit 510 containing a front panel 511 and a filter glass 512, for example. This video display screen unit 510 is the display device with a touch detection function according to any one of the first to ninth embodiments and the modifications.

(Application Example 2)

Figure 37:
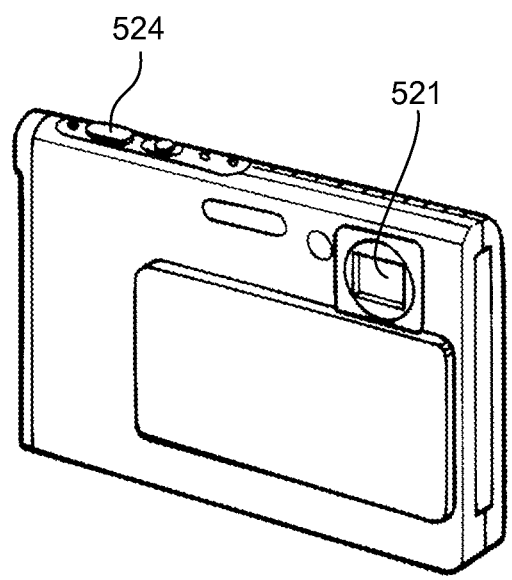
FIG. 37 is a diagram illustrating an example of an electronic apparatus to which the display device with a touch detection function according to any one of the embodiments is applied.
Figure 38:
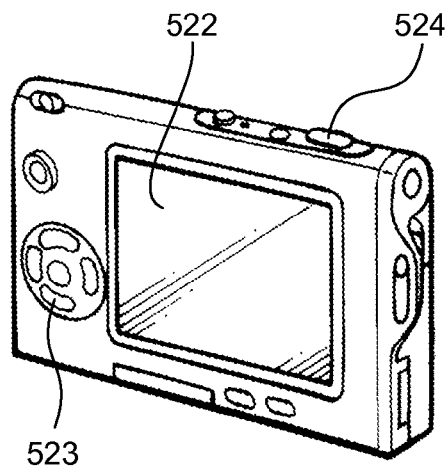
FIG. 38 is a diagram illustrating an example of an electronic apparatus to which the display device with a touch detection function according to any one of the embodiments is applied.

An electronic apparatus illustrated in FIGS. 37 and 38 is a digital camera to which the display device with a touch detection function 1 according to any one of the first to ninth embodiments and the modifications is applied. This digital camera includes: a flash light-emitting unit 521; a display unit 522; a menu switch 523; and a shutter button 524, for example. The display unit 522 is the display device with a touch detection function according to any one of the first to ninth embodiments and the modifications.

(Application Example 3)

Figure 39:
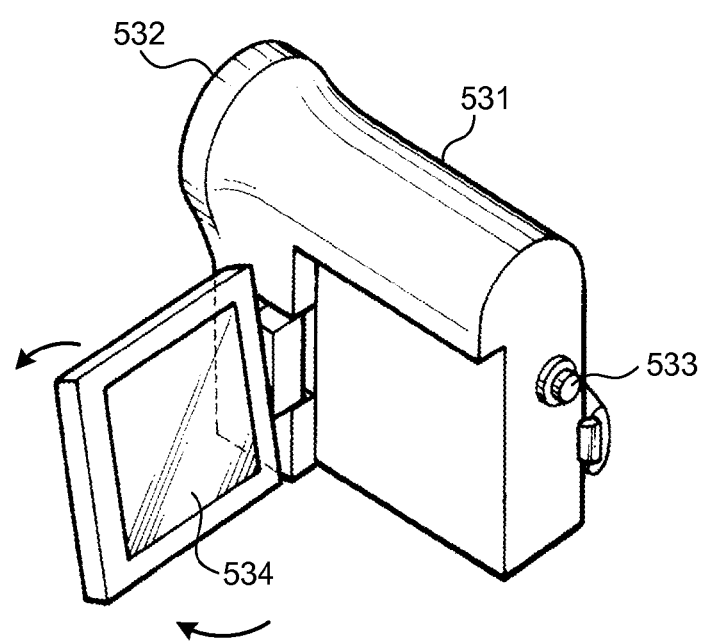
FIG. 39 is a diagram illustrating an example of an electronic apparatus to which the display device with a touch detection function according to any one of the embodiments is applied.

An electronic apparatus illustrated in FIG. 39 illustrates an appearance of a video camera to which the display device with a touch detection function 1 according to any one of the first to ninth embodiments and the modifications is applied. This video camera includes: a main body unit 531; a lens 532 for capturing an object, which is provided on a front side surface of the main body unit 531; a start/stop switch 533; and a display unit 534, for example. The display unit 534 is the display device with a touch detection function according to any one of the first to ninth embodiments and the modifications.

(Application Example 4)

Figure 40:
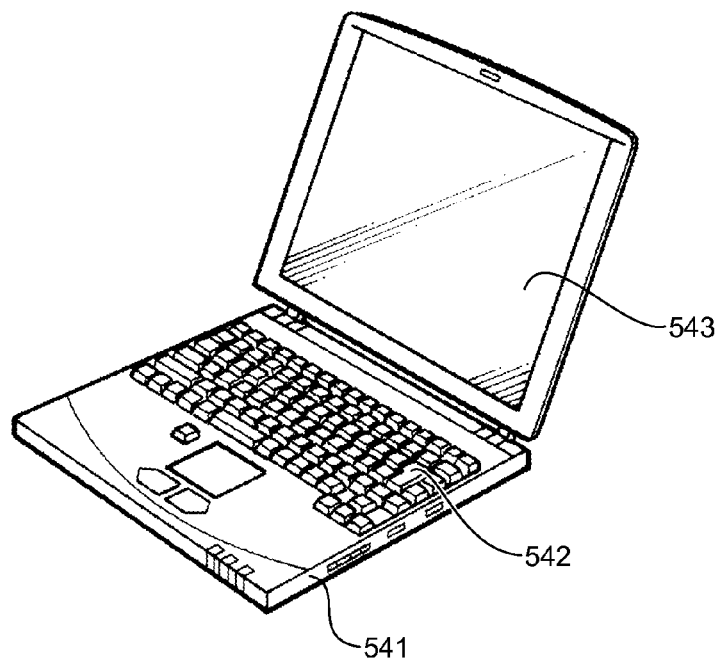
FIG. 40 is a diagram illustrating an example of an electronic apparatus to which the display device with a touch detection function according to any one of the embodiments is applied.
Figure 41:
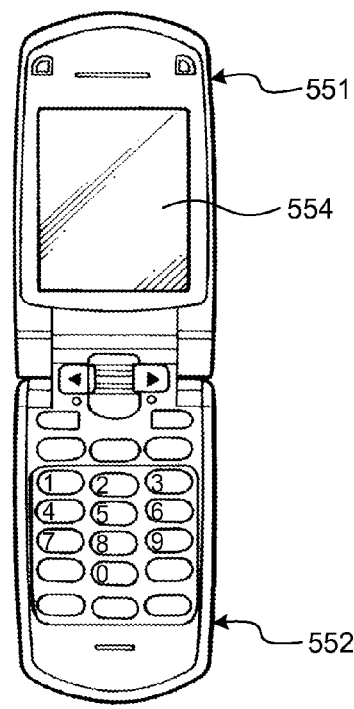
FIG. 41 is a diagram illustrating an example of an electronic apparatus to which the display device with a touch detection function according to any one of the embodiments is applied.
Figure 42:
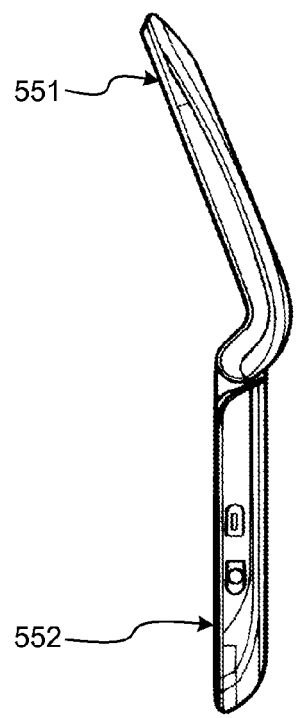
FIG. 42 is a diagram illustrating an example of an electronic apparatus to which the display device with a touch detection function according to any one of the embodiments is applied.
Figure 43:
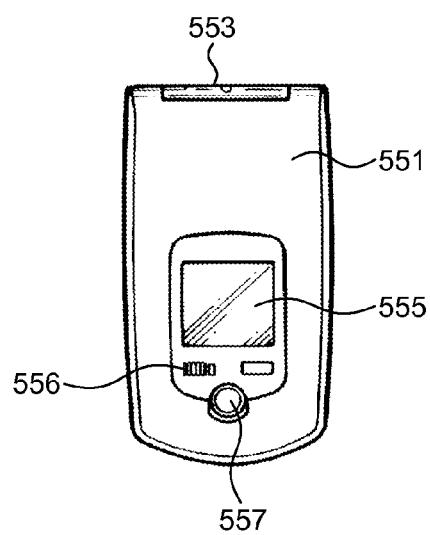
FIG. 43 is a diagram illustrating an example of an electronic apparatus to which the display device with a touch detection function according to any one of the embodiments is applied.
Figure 44:
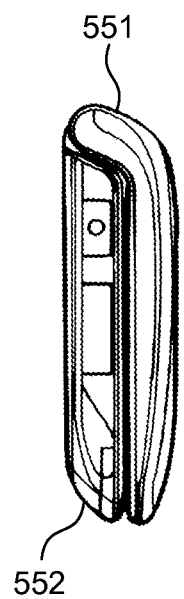
FIG. 44 is a diagram illustrating an example of an electronic apparatus to which the display device with a touch detection function according to any one of the embodiments is applied.
Figure 45:
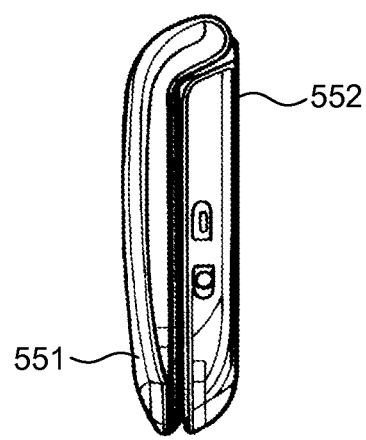
FIG. 45 is a diagram illustrating an example of an electronic apparatus to which the display device with a touch detection function according to any one of the embodiments is applied.
Figure 46:
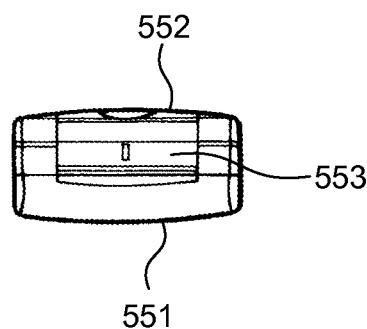
FIG. 46 is a diagram illustrating an example of an electronic apparatus to which the display device with a touch detection function according to any one of the embodiments is applied.
Figure 47:
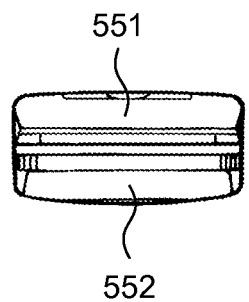
FIG. 47 is a diagram illustrating an example of an electronic apparatus to which the display device with a touch detection function according to any one of the embodiments is applied.

An electronic apparatus illustrated in FIG. 40 is a notebook personal computer to which the display device with a touch detection function 1 according to any one of the first to ninth embodiments and the modifications is applied. This notebook personal computer includes: a main body 541; a keyboard 542 provided for an operation of inputting characters and the like; and a display unit 543 for displaying an image, for example. The display unit 543 is the display device with a touch detection function according to any one of the first to ninth embodiments and the modifications.

(Application Example 5)

An electronic apparatus illustrated in FIGS. 41 to 47 is a mobile phone to which the display device with a touch detection function 1 according to any one of the first to ninth embodiments and the modifications is applied. For example, this mobile phone is configured by coupling an upper housing 551 with a lower housing 552 by means of a coupling unit (hinge unit) 553, and includes: a display 554; a sub-display 555; a picture light 556; and a camera 557. The display 554 or the sub-display 555 is the display device with a touch detection function according to any one of the first to ninth embodiments and the modifications.

3. Aspects of Present Disclosure

The present disclosure includes aspects as follows.

(1) A display device with a touch detection function, comprising:
a first substrate;
a plurality of pixel electrodes arranged in a matrix on a plane parallel to the first substrate and in a first region;
a display functional layer exerting an image display function in the first region;
a plurality of first drive electrodes facing the pixel electrodes in a perpendicular direction with respect to a surface of the first substrate; and
a plurality of touch detection electrodes facing the first drive electrodes in the perpendicular direction and extending in a direction different from a direction in which the first drive electrodes are extended, the plurality of touch detection electrodes being capacitively-coupled to the first drive electrodes, wherein
at least one touch detection electrode of the plurality of touch detection electrodes extends from the first region to a second region adjacent to the first region, and
a second drive electrode capacitively-coupled to the at least one touch detection electrode is further provided in the second region.

(2) The display device with a touch detection function according to (1), wherein the second region overlaps an area outside an image display area of the display functional layer as viewed from the perpendicular direction.

(3) The display device with a touch detection function according to (1), comprising a drive signal supplying circuit for supplying a drive signal to the first and second drive electrodes, wherein
the drive signal supplying circuit sequentially selects the first drive electrodes and the second drive electrode to supply the drive signal thereto.

(4) The display device with a touch detection function according to (3), wherein the drive signal supplying circuit supplies the drive signal to the second drive electrode even when the display functional layer is not performing image display.

(5) The display device with a touch detection function according to (1), wherein a width of the at least one touch detection electrode in the second region is larger than a width thereof in the first region.

(6) The display device with a touch detection function according to (1), wherein
the second drive electrode is formed in the same layer as the touch detection electrode and has an opening as viewed from the perpendicular direction, and
an end portion of the at least one touch detection electrode extends to an inside of the opening.

(7) The display device with a touch detection function according to (1), comprising a second substrate facing the first substrate in the perpendicular direction, wherein
the second substrate includes a portion not overlapping the first substrate as viewed from the perpendicular direction, and
the second drive electrode is formed in the portion of the second substrate not overlapping the first substrate.

(8) The display device with a touch detection function according to (1), comprising a backlight for irradiating the display functional layer with light, wherein
the backlight also irradiates the second region with light in addition to the first region.

(9) The display device with a touch detection function according to (1), comprising:
a backlight for irradiating the display functional layer with light; and
a light source disposed in a dead space in the backlight, for irradiating the second region with light.

(10) The display device with a touch detection function according to (8), wherein
the display functional layer is formed also in the second region, and the display device further comprises:
a luminance control electrode formed in the second region, for applying an electric field to the display functional layer; and
a control unit for changing a luminance of the second region by controlling the luminance control electrode.

(11) A display device with a touch detection function, comprising:
a first substrate;
a plurality of pixel electrodes arranged in a matrix on a plane parallel to the first substrate and in a first region;
a display functional layer exerting an image display function;
a plurality of first drive electrodes facing the pixel electrodes in a perpendicular direction with respect to a surface of the first substrate;
a plurality of first touch detection electrodes facing the first drive electrodes in the perpendicular direction and extending in a direction different from a direction in which the first drive electrodes are extended, the plurality of first touch detection electrodes being capacitively-coupled to the first drive electrodes;
a second drive electrode formed in a second region adjacent to the first region;
a second touch detection electrode capacitively-coupled to the second drive electrode in the second region; and
a drive signal supplying circuit for supplying a drive signal to the first and second drive electrodes, wherein
the drive signal supplying circuit sequentially selects the plurality of first drive electrodes and the second drive electrode to supply the drive signal thereto.

(12) The display device with a touch detection function according to (11), wherein the second region overlaps an area outside an image display area of the display functional layer as viewed from the perpendicular direction.

(13) The display device with a touch detection function according to (11), comprising a third substrate for transmitting a detection signal detected in the second touch detection electrode to an outside, wherein
the second touch detection electrode is formed on the third substrate.

(14) The display device with a touch detection function according to (11), comprising a backlight for irradiating the display functional layer with light, wherein
the backlight also irradiates the second region with light in addition to the first region.

(15) The display device with a touch detection function according to (11), comprising:
a backlight for irradiating the display functional layer with light; and
a light source disposed in a dead space in the backlight, for irradiating the second region with light.

(16) The display device with a touch detection function according to (14), wherein
the display functional layer is formed also in the second region, and
the display device further comprises:
a luminance control electrode formed in the second region, for applying an electric field to the display functional layer; and
a control unit for changing a luminance of the second region by controlling the luminance control electrode.

(17) The display device with a touch detection function according to (11), wherein
the second drive electrode is formed in the same layer as the second touch detection electrode and has an opening as viewed from the perpendicular direction, and
an end portion of the second touch detection electrode extends to an inside of the opening.

(18) The display device with a touch detection function according to (11), comprising a cover glass for covering the first substrate in the perpendicular direction with respect to the surface of the first substrate, wherein
the second touch detection electrode is formed on the cover glass.

(19) A display device with a touch detection function, comprising:
a first substrate;
a plurality of pixel electrodes arranged in a matrix on a plane parallel to the first substrate and in a first region;
a display functional layer exerting an image display function;
a plurality of first drive electrodes facing the pixel electrodes in a perpendicular direction with respect to a surface of the first substrate;
a plurality of touch detection electrodes facing the first drive electrodes in the perpendicular direction and extending in a direction different from a direction in which the first drive electrodes are extended, the plurality of touch detection electrodes being capacitively-coupled to the first drive electrodes;
a second drive electrode capacitively-coupled to at least one touch detection electrode of the plurality of touch detection electrodes in a second region adjacent to the first region; and
a second substrate facing the first substrate in the perpendicular direction, wherein
the second substrate includes a portion not overlapping the first substrate as viewed from the perpendicular direction, and
the second drive electrode is formed in the portion of the second substrate not overlapping the first substrate.

(20) A display device with a touch detection function, comprising:
a first substrate;
a plurality of pixel electrodes arranged in a matrix on a plane parallel to the first substrate and in a first region;
a display functional layer exerting an image display function;
a plurality of first drive electrodes facing the pixel electrodes in a perpendicular direction with respect to a surface of the first substrate;
a plurality of first touch detection electrodes facing the first drive electrodes in the perpendicular direction and extending in a direction different from a direction in which the first drive electrodes are extended, the plurality of first touch detection electrodes being capacitively-coupled to the first drive electrodes;
a second drive electrode formed in a second region adjacent to the first region;
a second touch detection electrode capacitively-coupled to the second drive electrode in the second region;
a drive signal supplying circuit for supplying a drive signal to the first and second drive electrodes; and
a third substrate for transmitting a detection signal detected in the second touch detection electrode to an outside, wherein
the second touch detection electrode is formed on the third substrate.

(21) The display device with a touch detection function according to (20), wherein the drive signal supplying circuit drives the first drive electrode and the second drive electrode in parallel.

(22) An electronic apparatus comprising a display device with a touch detection function capable of detecting an external proximity object, the display device with a touch detection function comprising:
a first substrate;
a plurality of pixel electrodes arranged in a matrix on a plane parallel to the first substrate and in a first region;
a display functional layer exerting an image display function in the first region;
a plurality of first drive electrodes facing the pixel electrodes in a perpendicular direction with respect to a surface of the first substrate; and
a plurality of touch detection electrodes facing the first drive electrodes in the perpendicular direction and extending in a direction different from a direction in which the first drive electrodes are extended, the plurality of touch detection electrodes being capacitively-coupled to the first drive electrodes, wherein
at least one touch detection electrode of the plurality of touch detection electrodes extends from the first region to a second region adjacent to the first region, and
a second drive electrode capacitively-coupled to the at least one touch detection electrode is further provided in the second region.

(23) An electronic apparatus comprising a display device with a touch detection function capable of detecting an external proximity object, the display device with a touch detection function comprising:
a first substrate;
a plurality of pixel electrodes arranged in a matrix on a plane parallel to the first substrate and in a first region;
a display functional layer exerting an image display function;
a plurality of first drive electrodes facing the pixel electrodes in a perpendicular direction with respect to a surface of the first substrate;
a plurality of first touch detection electrodes facing the first drive electrodes in the perpendicular direction and extending in a direction different from a direction in which the first drive electrodes are extended, the plurality of first touch detection electrodes being capacitively-coupled to the first drive electrodes;
a second drive electrode formed in a second region adjacent to the first region;
a second touch detection electrode capacitively-coupled to the second drive electrode in the second region; and
a drive signal supplying circuit for supplying a drive signal to the first and second drive electrodes, wherein
the drive signal supplying circuit sequentially selects the plurality of first drive electrodes and the second drive electrode to supply the drive signal thereto.

(24) An electronic apparatus comprising a display device with a touch detection function capable of detecting an external proximity object, the display device with a touch detection function comprising:
a first substrate;
a plurality of pixel electrodes arranged in a matrix on a plane parallel to the first substrate and in a first region;
a display functional layer exerting an image display function;
a plurality of first drive electrodes facing the pixel electrodes in a perpendicular direction with respect to a surface of the first substrate;
a plurality of touch detection electrodes facing the first drive electrodes in the perpendicular direction and extending in a direction different from a direction in which the first drive electrodes are extended, the plurality of touch detection electrodes being capacitively-coupled to the first drive electrodes;
a second drive electrode capacitively-coupled to at least one touch detection electrode of the plurality of touch detection electrodes in a second region adjacent to the first region; and
a second substrate facing the first substrate in the perpendicular direction, wherein
the second substrate includes a portion not overlapping the first substrate as viewed from the perpendicular direction, and
the second drive electrode is formed in the portion of the second substrate not overlapping the first substrate.

(25) An electronic apparatus comprising a display device with a touch detection function capable of detecting an external proximity object, the display device with a touch detection function comprising:
a first substrate;
a plurality of pixel electrodes arranged in a matrix on a plane parallel to the first substrate and in a first region;
a display functional layer exerting an image display function;
a plurality of first drive electrodes facing the pixel electrodes in a perpendicular direction with respect to a surface of the first substrate;
a plurality of first touch detection electrodes facing the first drive electrodes in the perpendicular direction and extending in a direction different from a direction in which the first drive electrodes are extended, the plurality of first touch detection electrodes being capacitively-coupled to the first drive electrodes;
a second drive electrode formed in a second region adjacent to the first region;
a second touch detection electrode capacitively-coupled to the second drive electrode in the second region;
a drive signal supplying circuit for supplying a drive signal to the first and second drive electrodes; and
a third substrate for transmitting a detection signal detected in the second touch detection electrode to an outside, wherein
the second touch detection electrode is formed on the third substrate.

The electronic apparatus of the present disclosure includes the above-described display device with a touch detection function. Examples of the electronic apparatus include, but are not limited to, a television device, a digital camera, a personal computer, a video camera, a portable electronic apparatus such as a mobile phone, etc.

According to the display device with a touch detection function and the electronic apparatus of the present disclosure, button touch input can be detected while suppressing an increase in the number of components and achieving a cost reduction.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A display device with a touch detection function, comprising:
a first substrate;
a plurality of pixel electrodes that are present on a plane parallel to the first substrate and in a first region;
a display functional layer configured to exert an image display function;
a plurality of first drive electrodes facing the pixel electrodes in a perpendicular direction with respect to a surface of the first substrate;
a plurality of first touch detection electrodes that face the first drive electrodes in the perpendicular direction and that are capacitively-coupled to the first drive electrodes;
a second touch detection electrode that is disposed in a second region adjacent to the first region and that is in a different layer from the first touch detection electrodes,
wherein
at least one of the touch detection electrodes extends from the first region to the second region,
the second touch detection electrode overlaps at least the one of the first touch detection electrodes in the second region, as viewed from the perpendicular direction, and
a width of the at least one first touch detection electrode in the second region is larger than a width thereof in the first region.

2. The display device with a touch detection function according to claim 1, comprising a backlight configured to irradiate the display functional layer with light, wherein
the backlight is also configured to irradiate the second region with light in addition to the first region.

3. The display device with a touch detection function according to claim 2, wherein
the display functional layer is present also in the second region, and
the display device further comprises:
a luminance control electrode that is in the second region, and configured to apply an electric field to the display functional layer; and
a control unit configured to change a luminance of the second region by controlling the luminance control electrode.

4. The display device with a touch detection function according to claim 1, comprising:
a backlight configured to irradiate the display functional layer with light; and
a light source that is present in a dead space in the backlight, and configured to irradiate the second region with light.

5. The display device with a touch detection function according to claim 1, further comprising a third substrate that is present on a second substrate facing the first substrate in the perpendicular direction, wherein
the second touch detection electrode is formed on the third substrate.

6. The display device with a touch detection function according to claim 5, wherein
the third substrate is a cover glass.

7. The display device with a touch detection function according to claim 6, wherein
the second touch detection electrode is disposed on a first substrate side of the cover glass, and
a light-shielding layer is present between the cover glass and the second touch detection electrode.

8. A display device with a touch detection function, comprising:
a first substrate;
a second substrate facing the first substrate in a perpendicular direction;
a display functional layer configured to exert an image display function and that is present between the first substrate and the second substrate;
a plurality of pixel electrodes that are present in a first region on a plane parallel to the first substrate;
a third substrate that is present on an observer side of the second substrate without overlapping the second substrate in the first region as viewed from the perpendicular direction, the third substrate being coupled to the second substrate in a second region adjacent to the first region;
a plurality of first drive electrodes facing the pixel electrodes in a perpendicular direction with respect to a surface of the first substrate;
a plurality of first touch detection electrodes that face the first drive electrodes in the perpendicular direction and that are capacitively-coupled to the first drive electrodes;
a second touch detection electrode that is present on the third substrate in the second region and that is in a different layer from the first touch detection electrodes,
wherein
the first touch detection electrodes extend from the first region to the second region, and
the second touch detection electrode overlaps at least the one of the first touch detection electrodes in the second region without overlapping the first touch detection electrodes in the first region, as viewed from the perpendicular direction.

9. The display device with a touch detection function according to claim 8, further comprising
a second drive electrode that is present in a same layer of the first drive electrodes and that is capacitively-coupled to the second touch detection electrode that is further present in the second region, and
a drive signal supplying circuit configured to supply a drive signal to the first and second drive electrodes, wherein
the drive signal supplying circuit is configured to sequentially select the first drive electrodes and the second drive electrode to supply the drive signal thereto.

10. The display device with a touch detection function according to claim 9, wherein the drive signal supplying circuit is configured to supply the drive signal to the second drive electrode even when the display functional layer is not performing image display.

11. The display device with a touch detection function according to claim 8, wherein the second region is a frame area of the display device.

12. The display device with a touch detection function according to claim 11, wherein the second touch detection electrode is present on an observer side of the display device relative to the first touch detection electrodes.

13. The display device with a touch detection function according to claim 8, wherein the third substrate is a flexible substrate.

14. The display device with a touch detection function according to claim 8, comprising a backlight configured to irradiate the display functional layer with light,
wherein the backlight also is configured to irradiate the second region with light in addition to the first region.

15. The display device with a touch detection function according to claim 14,
wherein the display functional layer is present also in the second region, and
the display device further comprises:
a luminance control electrode that is present in the second region, and configured to apply an electric field to the display functional layer; and
a control unit configured to change a luminance of the second region by controlling the luminance control electrode.

16. The display device with a touch detection function according to claim 8, further comprising:
a backlight configured to irradiate the display functional layer with light; and
a light source that is present in a dead space in the backlight, and is configured to irradiate the second region with light.

17. The display device with a touch detection function according to claim 8, further comprising a second drive electrode capacitively-coupled to the at least one touch detection electrode is further present in the second region, wherein
the second drive electrode is present in the same layer as the second touch detection electrode and has an opening as viewed from the perpendicular direction, and
an end portion of the second touch detection electrode extends to an inside of the opening.

18. The display device with a touch detection function according to claim 8, further comprising:
a second drive electrode provided in a same layer of the first drive electrodes; and
a drive signal supplying circuit configured to supply a drive signal to the first and second drive electrodes, wherein
the first touch detection electrodes extend in a direction different from a direction in which the first drive electrodes are extended,
the second touch detection electrode is capacitively-coupled to the second drive electrode in the second region,
and
the third substrate is configured to transmit a detection signal detected in the second touch detection electrode to an outside.

19. The display device with a touch detection function according to claim 18, wherein the drive signal supplying circuit drives the first drive electrode and the second drive electrode in parallel.

20. An electronic apparatus comprising a display device with a touch detection function capable of detecting an external proximity object, the display device with a touch detection function comprising:
a first substrate;
a second substrate facing the first substrate in the perpendicular direction;
a display functional layer configured to exert an image display function and that is present between the first substrate and the second substrate;
a plurality of pixel electrodes that are present in a first region on a plane parallel to the first substrate;
a third substrate that is present on an observer side of the second substrate without overlapping the second substrate in the first region as viewed from the perpendicular direction, the third substrate being coupled to the second substrate in a second region adjacent to the first region;
a plurality of first drive electrodes facing the pixel electrodes in a perpendicular direction with respect to a surface of the first substrate;
a plurality of first touch detection electrodes that face the first drive electrodes in the perpendicular direction and that are capacitively-coupled to the first drive electrodes;
a second touch detection electrode that is present on the third substrate in the second region and that is in a different layer from the first touch detection electrodes, wherein
the first touch detection electrodes extends from the first region to the second region, and
the second touch detection electrode overlaps at least the one of the first touch detection electrodes in the second region without overlapping the first touch detection electrodes in the first region, as viewed from the perpendicular direction.

21. The electronic apparatus according to claim 20, further comprising:
a second drive electrode provided in a same layer of the first drive electrodes;
a drive signal supplying circuit for supplying a drive signal to the first and second drive electrodes,
wherein the first touch detection electrodes extend in a direction different from a direction in which the first drive electrodes are extended,
the second touch detection electrode is capacitively-coupled to the second drive electrode in the second region,
and
the third substrate is configured to transmit a detection signal detected in the second touch detection electrode to an outside.

* * * * *